United States Patent [19]
Tanaka

[11] Patent Number: 5,483,452
[45] Date of Patent: Jan. 9, 1996

[54] APPARATUS FOR DETECTING FAILURES OF LONGITUDINAL ACCELERATION SENSOR

[75] Inventor: Hirohisa Tanaka, Itami, Japan

[73] Assignee: Sumitomo Electric Industries, Ltd., Osaka, Japan

[21] Appl. No.: 341,054

[22] Filed: Nov. 16, 1994

[30] Foreign Application Priority Data

Nov. 25, 1993 [JP] Japan ..................... 5-295085
Nov. 9, 1994 [JP] Japan ..................... 6-274971

[51] Int. Cl.$^6$ .............. G06F 19/00; G01P 3/00
[52] U.S. Cl. ................ 364/426.01; 364/424.03
[58] Field of Search ................ 364/426.01, 566, 364/424.03, 565, 426.02; 180/197; 303/97, 99

[56] References Cited

U.S. PATENT DOCUMENTS

| | | | |
|---|---|---|---|
| 4,917,443 | 4/1990 | Kramer et al. | 303/92 |
| 4,969,100 | 11/1990 | Takata et al. | 364/426.02 |
| 4,974,163 | 11/1990 | Yasuno et al. | 364/426.02 |
| 5,170,343 | 12/1992 | Matsuda | 364/184 |
| 5,200,896 | 4/1993 | Sato et al. | 364/426.01 |
| 5,208,754 | 5/1993 | Nakaura et al. | 364/426.01 |
| 5,212,640 | 5/1993 | Matsuda | 364/424.03 |

FOREIGN PATENT DOCUMENTS

| | | |
|---|---|---|
| 2284068 | 11/1990 | Japan . |
| 4110267 | 4/1992 | Japan . |
| 4223275 | 8/1992 | Japan . |

*Primary Examiner*—Michael Zanelli
*Attorney, Agent, or Firm*—Sandler, Greenblum & Bernstein

[57] ABSTRACT

An apparatus for detecting failures of a longitudinal acceleration sensor for detecting a longitudinal acceleration of a motor vehicle, comprising: a wheel speed calculating device for calculating wheel speeds on the basis of outputs of wheel speed sensors; an estimated vehicle body acceleration calculating device for calculating an estimated vehicle body acceleration on the basis of the wheel speeds; a comparative arithmetic device which calculates a ratio of a vehicle body acceleration calculated from an output of the longitudinal acceleration sensor to the estimated vehicle body acceleration and calculates a first integrating value by performing a subtraction and an addition for the first integrating value when the ratio falls within and out of a predetermined range, respectively; and a fail-safe device for performing a predetermined fail-safe processing if the first integrating value is larger than a predetermined value.

25 Claims, 19 Drawing Sheets

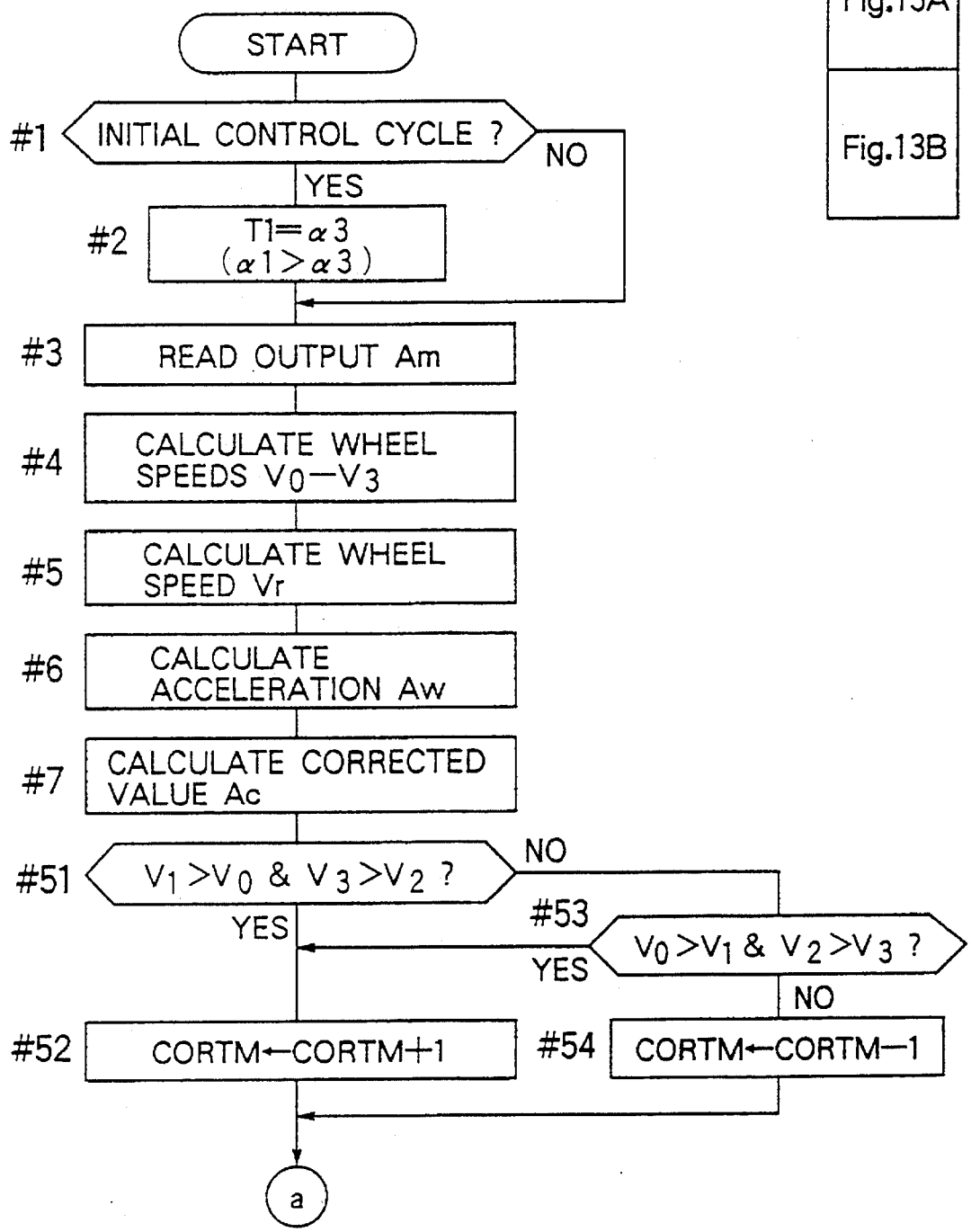

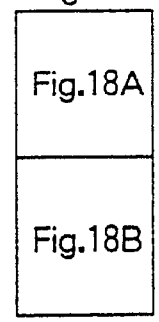
Fig.18A
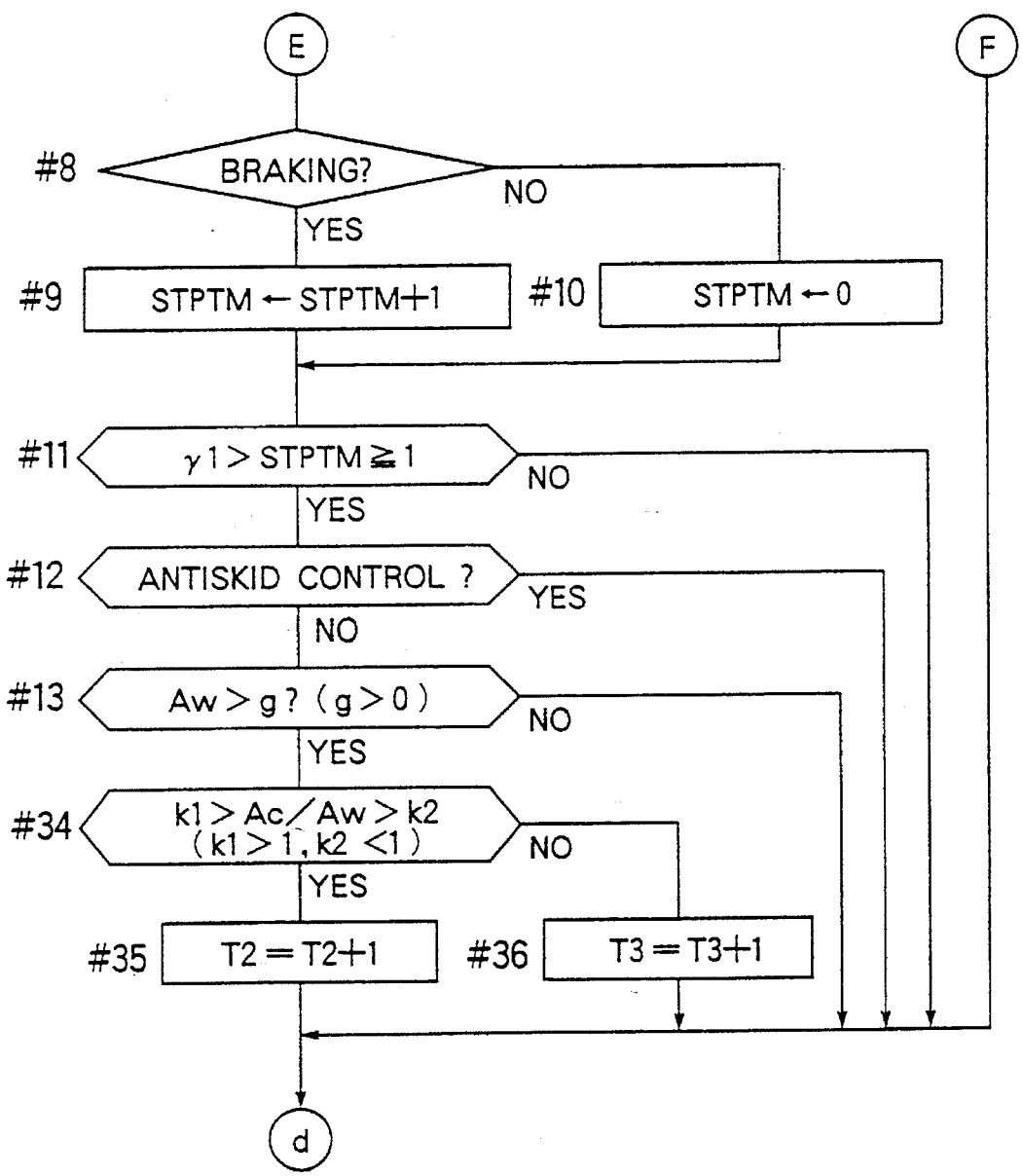

5,483,452

APPARATUS FOR DETECTING FAILURES OF LONGITUDINAL ACCELERATION SENSOR

BACKGROUND OF THE INVENTION

The present invention generally relates to an apparatus for detecting failures of a longitudinal acceleration sensor for detecting longitudinal acceleration of a motor vehicle and more particularly, to an apparatus which is capable of detecting not only a small-gain failure that output of the longitudinal acceleration sensor is smaller than actual acceleration of the motor vehicle but a large-gain failure that output of the longitudinal acceleration sensor is larger than actual acceleration of the motor vehicle and is properly used for an antiskid control system.

Conventionally, in order to improve control accuracy of an antiskid-control system, it has been proposed to utilize signals from a longitudinal acceleration sensor for detecting longitudinal acceleration of a motor vehicle. The antiskid control system performs control on the premise that the longitudinal acceleration sensor is normal. Therefore, in case failures of the longitudinal acceleration sensor happen such that output value of the longitudinal acceleration sensor is smaller or larger than actual acceleration or deceleration of the motor vehicle, performance of the antiskid control system in which the signals from the longitudinal acceleration sensor are used as control data deteriorates greatly.

For example, in an antiskid control system in which the signals from the longitudinal acceleration sensor are used for performing estimated calculation of vehicle body speed, brake fluid pressure is reduced, increased or held on the basis of wheel speed which is calculated from vehicle body speed estimated from signals outputted by the longitudinal acceleration sensor and output of wheel speed sensors. Therefore, if vehicle body speed calculated from output of the longitudinal acceleration sensor is different from actual vehicle body speed, such problems arise that braking distance increases due to insufficient brake fluid pressure or wheels are locked due to excessive brake fluid pressure.

In order to solve these problems, an apparatus for detecting failures of the longitudinal acceleration sensor has been proposed so far. For example, Japanese Patent Laid-Open Publication No. 2-284068 (1990) proposes an apparatus which, if it is found that output of a longitudinal acceleration sensor has a value indicative of acceleration or deceleration of a motor vehicle when the motor vehicle is running at a constant speed, judges the longitudinal acceleration sensor to be defective so as to perform fail-safe processing.

However, this known apparatus is capable of detecting failures of the longitudinal acceleration sensor in case output is generated from the longitudinal acceleration sensor in spite of a state that the motor vehicle is neither accelerated not decelerated or in case output of the longitudinal acceleration sensor is larger than actual acceleration or deceleration of the motor vehicle (large-gain failure). On the other hand, the known apparatus is not capable of detecting failures of the longitudinal acceleration sensor when output is not generated from the longitudinal acceleration sensor in spite of a state that the motor vehicle is being accelerated or decelerated or when output of the longitudinal acceleration sensor is smaller than actual acceleration or deceleration of the motor vehicle (small-gain failure). Therefore, in an antiskid control system incorporating the known apparatus, in case small-gain failure happens, it is judged that road surface has low coefficient μ of friction even if road surface actually has high coefficient μ of friction, so that control for road surface having low coefficient μ of friction is performed, thereby resulting in increase of stopping distance, etc.

Meanwhile, Japanese Patent Laid-Open Publication No. 4-110267 (1992) proposes an apparatus for detecting failures of a longitudinal acceleration sensor and a transverse acceleration sensor for detecting transverse acceleration of a motor vehicle. When it is found that output of the longitudinal acceleration sensor has a value indicative of acceleration or deceleration of the motor vehicle when the motor vehicle is running at a constant speed, the apparatus judges the longitudinal acceleration sensor to be defective. Meanwhile, if output level of the transverse acceleration sensor is not less than a predetermined level when there is no difference among wheel speeds of respective wheels, namely, the motor vehicle is running straight-forwardly, the apparatus judges the transverse acceleration sensor to be defective. Furthermore, in case output level of the transverse acceleration sensor is less than the predetermined level when difference between wheel speeds of the left and right wheels is not less than a predetermined value, namely, the motor vehicle is turning, the apparatus judges the transverse acceleration sensor to be defective.

However, in this prior art apparatus, the transverse acceleration sensor is capable of detecting both large-gain failure and small-gain failure but the longitudinal acceleration sensor is not capable of detecting small-gain failure. Therefore, in this prior art apparatus, the same problem as that of the above mentioned known apparatus arises.

SUMMARY OF THE INVENTION

Accordingly, an essential object of the present invention is to provide, with a view to eliminating the drawbacks inherent in conventional apparatuses, an apparatus which is capable of detecting both large-gain failure and small-gain failure of a longitudinal acceleration sensor.

In order to accomplish this object, the present invention, provides an apparatus for detecting failures of a longitudinal acceleration sensor for detecting a longitudinal acceleration of a motor vehicle, according to a first embodiment of the present invention comprising: a wheel speed calculating means for calculating wheel speeds on the basis of outputs of wheel speed sensors; an estimated vehicle body acceleration calculating means for calculating an estimated vehicle body acceleration on the basis of the wheel speeds; a comparative arithmetic means which calculates a ratio of a vehicle body acceleration calculated from an output of the longitudinal acceleration sensor to the estimated vehicle body acceleration and calculates a first integrating value by performing a subtraction and an addition for the first integrating value when the ratio falls within and out of a predetermined range, respectively; and a fail-safe means for performing a predetermined fail-safe processing if the first integrating value is larger than a predetermined value.

In this apparatus, also in the case of small-gain failure and large-gain failure of the longitudinal acceleration sensor, it is possible to detect failures of the longitudinal acceleration sensor positively.

Another aspect of the present invention provides an apparatus for detecting failures of a longitudinal acceleration sensor for detecting a longitudinal acceleration of a motor vehicle, according to a third embodiment of the present invention comprising: a wheel speed calculating means for calculating wheel speeds on the basis of outputs of wheel speed sensors; an estimated vehicle body acceleration calculating means for calculating an estimated vehicle body acceleration on the basis of the wheel speeds; a comparative arithmetic means which includes a first means for detecting that the motor vehicle is turning and a second means for detecting that wheels are spinning; wherein in case not only the motor vehicle is not turning but the wheel are not spinning, the comparative arithmetic means calculates a ratio of a vehicle body acceleration calculated from an output of the longitudinal acceleration sensor to the estimated vehicle body acceleration and calculates a first integrating value by performing a subtraction and an addition for the first integrating value when the ratio falls within and out of a predetermined range, respectively; and a fail-safe means for performing a predetermined fail-safe processing if the first integrating value is larger than a predetermined value.

In this apparatus, since such adverse influence brought about by turning of the motor vehicle and spin of the wheels as drop of accuracy of outputs of the longitudinal acceleration sensor and the wheel speed sensors is eliminated, it is possible to detect failures of the longitudinal acceleration sensor more accurately.

The present invention further provides an apparatus for detecting failures of a longitudinal acceleration sensor for detecting a longitudinal acceleration of a motor vehicle, according to a second embodiment of the present invention comprising: a wheel speed calculating means for calculating wheel speeds on the basis of outputs of wheel speed sensors; an estimated vehicle body acceleration calculating means for calculating an estimated vehicle body acceleration on the basis of the wheel speeds; a comparative arithmetic means which calculates a first ratio of a vehicle body acceleration calculated from an output of the longitudinal acceleration sensor to the estimated vehicle body acceleration and calculates second and third integrating values by performing an addition for the second and third integrating values when the first ratio falls within and out of a predetermined range, respectively; and a fail-safe means for performing a predetermined fail-safe processing if a second ratio of the third integrating value to the second integrating value is larger than a predetermined value.

In this apparatus, also in the case of small-gain failure and large-gain failure of the longitudinal acceleration sensor, it is possible to detect failures of the longitudinal acceleration sensor positively.

The present invention also provides an apparatus for detecting failures of a longitudinal acceleration sensor for detecting a longitudinal acceleration of a motor vehicle, according to a fourth embodiment of the present invention comprising: a wheel speed calculating means for calculating wheel speeds on the basis of outputs of wheel speed sensors; an estimated vehicle body acceleration calculating means for calculating an estimated vehicle body acceleration on the basis of the wheel speeds; a comparative arithmetic means which includes a first means for detecting that the motor vehicle is turning and a second means for detecting that wheels are spinning; wherein in case not only the motor vehicle is not turning but the wheels are not spinning, the comparative arithmetic means calculates a first ratio of a vehicle body acceleration calculated from an output of the longitudinal acceleration sensor to the estimated vehicle body acceleration and calculates second and third integrating values by performing an addition for the second and third integrating values when the first ratio falls within and out of a predetermined range, respectively; and a fail-safe means for performing a predetermined fail-safe processing if a second ratio of the third integrating value to the second integrating value is larger than a predetermined value.

In this apparatus, since such adverse influence brought about by turning of the motor vehicle and spin of the wheels as drop of accuracy of outputs of the longitudinal acceleration sensor and the wheel speed sensors is obviated, it is possible to detect failures of the longitudinal acceleration sensor more accurately.

BRIEF DESCRIPTION OF THE DRAWINGS

This object and features of the present invention will become apparent from the following description taken in conjunction with the preferred embodiments thereof with reference to the accompanying drawings, in which:

FIGS. 13, 13A and 13B and 14, 14A and 14B are flow charts showing operational sequences of the apparatus of FIG. 12;

FIGS. 17, 17A and 17B and 18, 18A and 18B are flow charts showing operational sequences of the apparatus of FIG. 16.

Before the description of the present invention proceeds, it is to be noted that like parts are designated by like reference numerals throughout several views of the accompanying drawings.

DETAILED DESCRIPTION OF THE INVENTION

Figure 1:
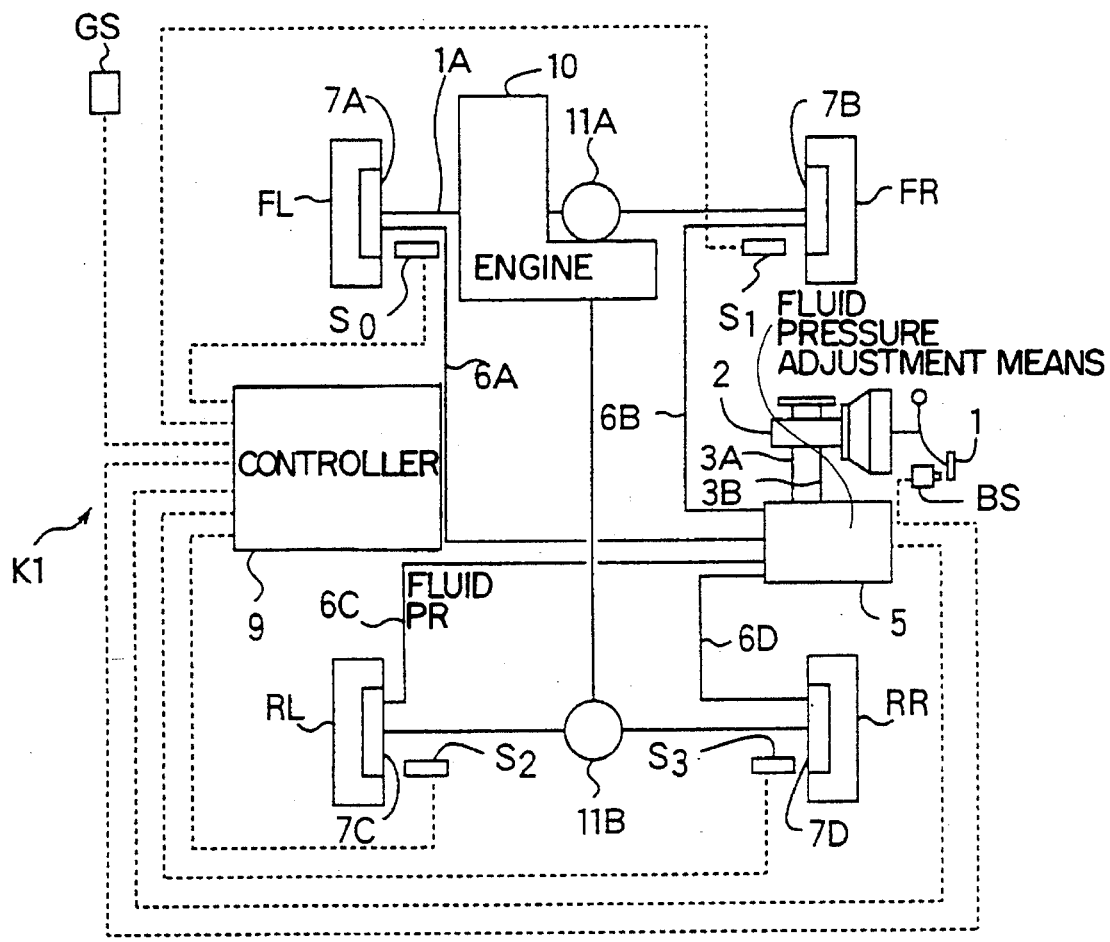
FIG. 1 is a schematic view of an antiskid control system including an apparatus for detecting failures of a longitudinal acceleration sensor, according to a first embodiment of the present invention.
Figure 2:
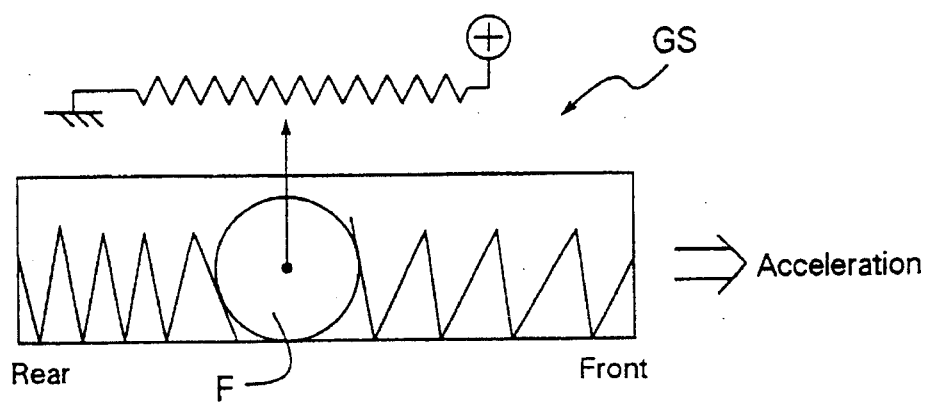
FIG. 2 is a schematic view of the longitudinal acceleration sensor of FIG. 1.
Figure 3:
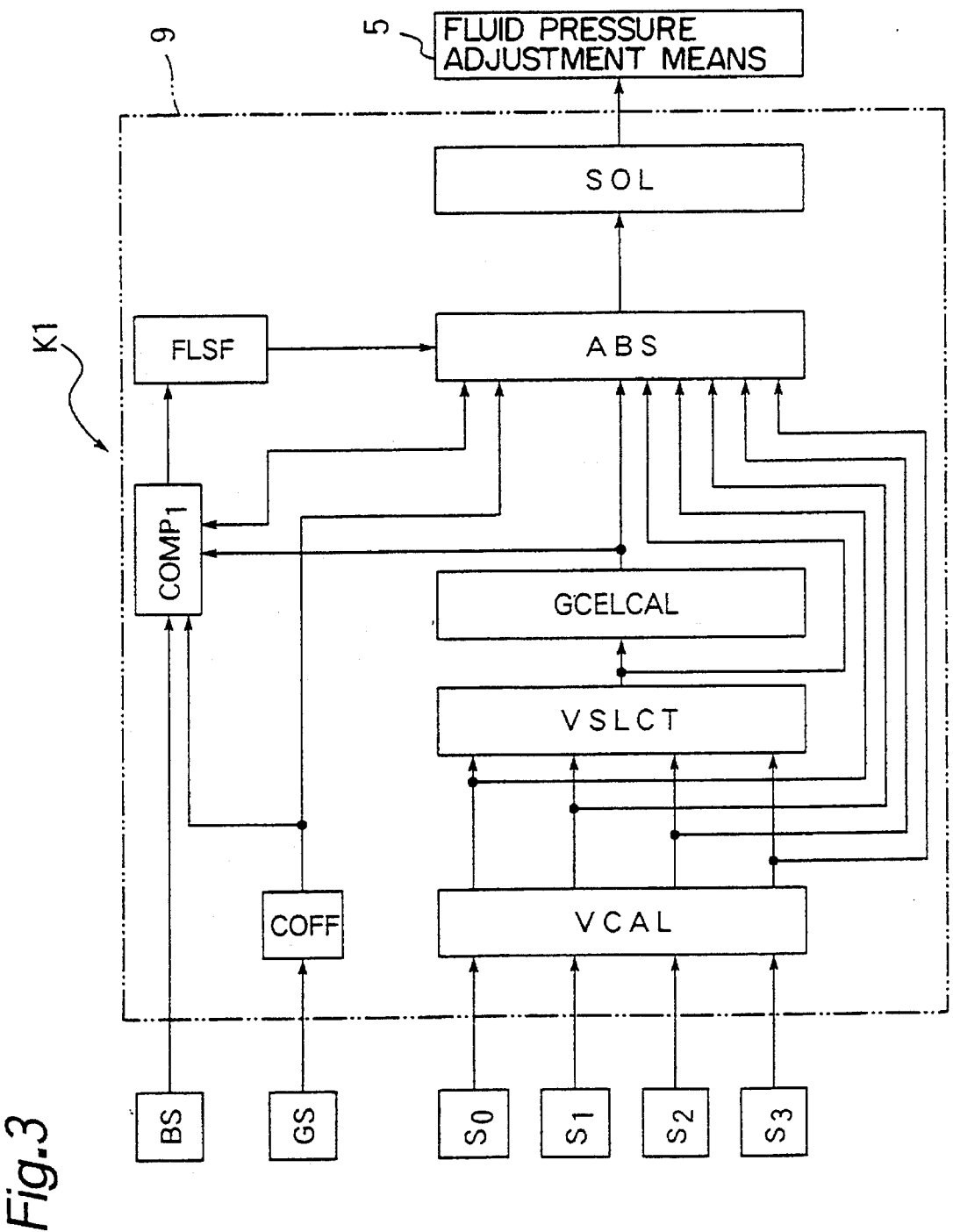
FIG. 3 is a schematic view of the apparatus of FIG. 1.

Referring now to the drawings, there is shown in FIGS. 1 to 3, an antiskid control system including an apparatus K1 for detecting failures of a longitudinal acceleration sensor GS, according to a first embodiment of the present invention. In the antiskid control system, conduits 3A and 3B are on the one hand connected with a master cylinder 2 actuated by a brake pedal 1 and are on the other hand connected, through a fluid pressure adjusting means 5, with conduits 6A, 6B, 6C and 6D leading to wheel brakes 7A, 7B, 7C and 7D of front left, front right, rear left and rear right wheels FL, FR, RL and RR, respectively. More specifically, the conduit 3A is connected, via the fluid pressure adjusting means 5, with the conduit 6A and 6D leading to the wheel brakes 7A and 7D of the front left and rear right wheels FL and RR, respectively, while the conduit 3B is connected, by way of the fluid pressure adjusting means 5, with the conduits 6B and 6C leading to the wheel brakes 7B and 7C of the front right and rear left wheels FR and RL, respectively.

The fluid pressure adjusting means 5 is of known type and increases, reduces or holds fluid pressure of the wheel brakes 7A to 7D in response to drive signals from a controller 9. Wheel speed sensors $S_0$, $S_1$, $S_2$ and $S_3$ output to the controller 9 pulse signals corresponding to rotational angular velocities of the front left, front right, rear left and rear right wheels FL, FR, RL and RR, respectively.

The longitudinal acceleration sensor GS is arranged to detect longitudinal acceleration of a motor vehicle. As shown in FIG. 2, the longitudinal acceleration sensor GS is a gravity type acceleration sensor in which displacement amount of a vibrator F produced by acceleration is converted into an electrical signal by using a resistor, a piezo-electric element, a differential transformer or the like and this electrical signal (sensor output Am) is outputted to the controller 9. In the following description, sign of the sensor output Am of the longitudinal acceleration sensor GS is set to be positive for deceleration and negative for acceleration.

When a driver kicks the brake pedal 1, a brake switch BS is turned on and outputs to the controller 9 a signal indicating that the brake pedal 1 is being kicked, i.e., a signal indicative of ON state of the brake pedal 1. Meanwhile, in FIG. 1, reference numeral 10 denotes an engine, while reference numerals 11A and 11B denote differential gears.

As shown in FIG. 3, the controller 9 includes a wheel speed calculating means VCAL, a wheel speed selecting means VSLCT, an estimated vehicle body acceleration calculating means GCELCAL, an antiskid control means ABS and a drive signal output means SOL. The controller 9 further includes a zero point correcting means COFF, a first comparative arithmetic means $COMP_1$ and a fail-safe means FLSF.

The wheel speed calculating means VCAL calculates wheel speeds $V_0$, $V_1$, $V_2$ and $V_3$ of the front left, front right, rear left and rear right wheels FL, FR, RL and RR on the basis of the pulse signals outputted by the wheel speed sensors $S_0$, $S_1$, $S_2$ and $S_3$, respectively. The calculated wheel speeds $V_0$ to $V_3$ are outputted to the wheel speed selecting means VSLCT and the antiskid control means ABS.

From the wheel speeds $V_0$ to $V_3$, the wheel speed selecting means VSLCT calculates a representative wheel speed $V_r$ for calculating an estimated vehicle body acceleration Aw to be described later. In this embodiment, the representative wheel speed $V_r$ is calculated from the following equation (1).

$$V_r = MAX(V_0, V_1, V_2, V_3) \quad (1)$$

In the equation (1), symbol "MAX" represents that a maximum value in parentheses is selected. Meanwhile, calculation method of the representative wheel speed $V_r$ is not restricted to the above equation (1). For example, a second largest value in the wheel speeds V0, V1, $V_2$ and $V_3$ may also be employed as the representative wheel speed $V_r$.

The calculated representative wheel speed $V_r$ is outputted to the estimated vehicle body acceleration calculating means GCELCAL and the antiskid control means ABS.

In the estimated vehicle body acceleration calculating means GCELCAL, the representative wheel speed $V_r$ referred to above is differentiated with respect to time so as to calculate the estimated vehicle body acceleration Aw. Meanwhile, in the following description, sign of the estimated vehicle body acceleration Aw is set to be positive for deceleration and negative for acceleration.

The estimated vehicle body acceleration Aw, the wheel speeds $V_0$ to $V_3$, the representative wheel speed $V_r$ and a corrected value Ac of detected vehicle body acceleration which is obtained by correcting zero point of the sensor output Am of the longitudinal acceleration sensor GS as will be described later are inputted to the antiskid control means ABS. From these factors, the antiskid control means ABS judges of pressure increase, pressure reduction or pressure holding for antiskid control. A signal of this judgement of pressure increase, pressure reduction or pressure holding by the antiskid control means ABS is outputted to the drive signal output means SOL. The fluid pressure adjusting means 5 is driven by a drive signal outputted from the drive signal output means SOL so as to increase, reduce or hold fluid pressure of the wheel brakes 7A to 7D.

In a state where a first prohibition signal $D_1$ to be described later is not inputted to the antiskid control means ABS, the antiskid control means ABS forms a judgement upon antiskid control by using the wheel speeds $V_0$ to $V_3$ and the corrected value Ac of detected vehicle body acceleration. Namely, the antiskid control means ABS compares vehicle body speed calculated from the corrected value of detected vehicle body acceleration and the representative wheel speed $V_r$ with the wheel speeds $V_0$ to $V_3$ so as to skid symptom of the front left, front right, rear left and rear right wheels FL, FR, RL and RR. In case the antiskid control means ABS judges that any one of the front left, front right, rear left and rear right wheels FL, FR, RL and RR has skid symptom, the antiskid control means ABS outputs the drive signal to the fluid pressure adjusting means 5 through the drive signal output means SOL so as to drive the fluid pressure adjusting means 5 such that fluid pressure of the corresponding one of the wheel brakes 7A to 7D is reduced. Meanwhile, after skid symptom has disappeared, the antiskid control means ABS drives the fluid pressure adjusting means 5 through comparison between the vehicle body speed calculated from the corrected value Ac of detected vehicle body acceleration and the reprensentive wheel speed $V_r$ and the wheel speeds $V_0$ to $V_3$ so as to increase or hold fluid pressure of the wheel brakes 7A to 7D.

On the other hand, when the first prohibition signal $D_1$ has been inputted to the antiskid control means ABS, the antiskid control means ABS forms a judgment upon antiskid control on the basis of the wheel speeds $V_0$ to $V_3$, the representative wheel speed $V_r$ and the estimated vehicle body acceleration Aw in place of the corrected value Ac of detected vehicle body acceleration.

Furthermore, in case antiskid control is being performed, the antiskid control means ABS outputs to the first comparative arithmetic means $COMP_1$ a signal indicating that antiskid control is being performed.

The zero point correcting means COFF corrects zero point of the sensor output Am of the longitudinal acceleration sensor GS, which has changed by influences such as temperature, changes with time, inclination of road surface due to a slope, etc. In this embodiment, zero point is corrected by a method described in Japanese Patent Laid-Open Publication No. 4-223275 (1992) filed by the assignee assigned by the present inventor as follows. Assuming that the estimated vehicle body acceleration Aw represents a real vehicle body acceleration, amount of zero point correction for the sensor output Am of the longitudinal acceleration sensor GS is (Aw–Am) and the sensor output Am of the longitudinal acceleration sensor GS is preferably drawn closer to the estimated vehicle body acceleration Aw as the motor vehicle is further free from excessive slip or spin of the wheels. Therefore, the corrected value Ac of detected vehicle body acceleration is calculated by subjecting the sensor output Am of the longitudinal acceleration sensor GS to zero point correction of filtering shown in the following equation (2).

$$Ac = Am + Ao$$

$$Ao = Ao + (Aw - Ac) \times r \qquad (2)$$

In the above equation (2), "Ao" denotes correction amount. The correction amount Ao in the left member of the equation (2) represents correction amount in this control cycle, while the correction amount Ao in the right member of the equation (2) represents correction amount in the preceding control cycle. Meanwhile, in the equation (2), "r" denotes a constant for determining a speed for causing the corrected value Ac of detected vehicle body acceleration to follow the estimated vehicle body acceleration Aw. This constant r is set to be more than 0 and less than 1, i.e., 0<r<1 and is drawn closer to 0 and 1 as symptom of spin or slip of the wheels is more conspicuous and inconspicuous, respectively. In the following description, sign of the corrected value Ac of detected vehicle body acceleration is to be positive for deceleration and negative for acceleration in the same manner as the sensor output Am of the longitudinal acceleration sensor GS and the estimated vehicle body acceleration Aw referred to earlier.

When the estimated vehicle body acceleration Aw is larger than a positive predetermined value g, the first comparative arithmetic means $COMP_1$ calculates ratio of the corrected value Ac of detected vehicle body acceleration to the estimated vehicle body acceleration Aw. When this ratio falls within a predetermined range, the first comparative arithmetic means $COMP_1$ subtracts a predetermined value from a first integrating value T1. On the other hand, when the ratio falls out of the predetermined range, the first comparative arithmetic means $COMP_1$ adds the predetermined value to the first integrating value T1. In each control cycle, this first integrating value T1 subjected to subtraction or addition is outputted to the fail-safe means FLSF.

If the above first integrating value T1 is larger than a first predetermined value $\alpha 1$ ($\alpha 1 > 0$), the fail-safe means FLSF outputs to the antiskid control means ABS the first prohibition signal $D_1$ prohibiting use of the longitudinal acceleration sensor GS. Meanwhile, when the above first integrating value T1 is larger than a second predetermined value $\beta 1$ greater than the first predetermined value $\alpha 1$, the fail-safe means FLSF outputs to the antiskid control means ABS a second prohibition signal $D_2$ prohibiting antiskid control.

Figure 4:
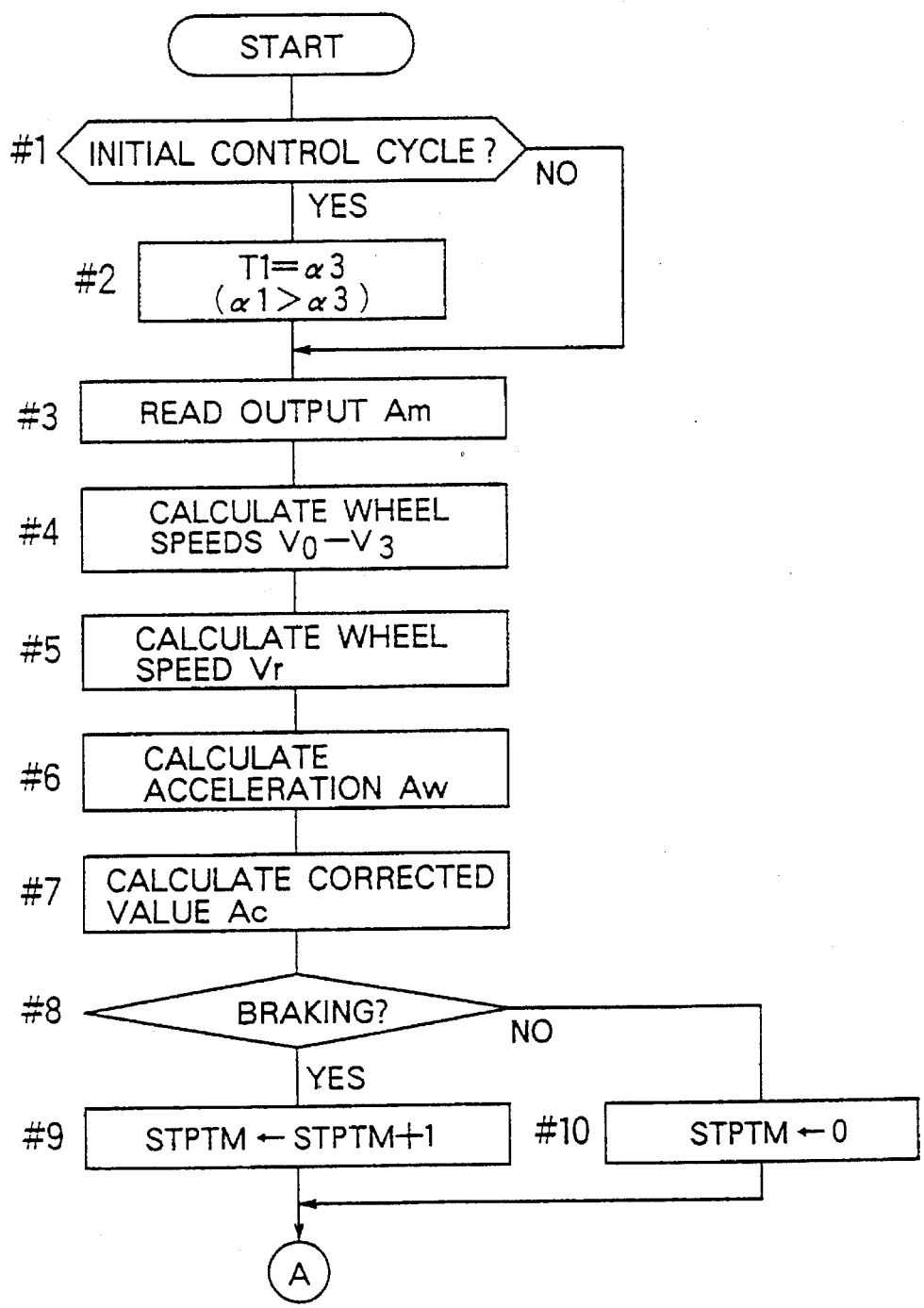
FIGS. 4 and 5 are flow charts showing operational sequences of the apparatus of FIG. 1.
Figure 5:
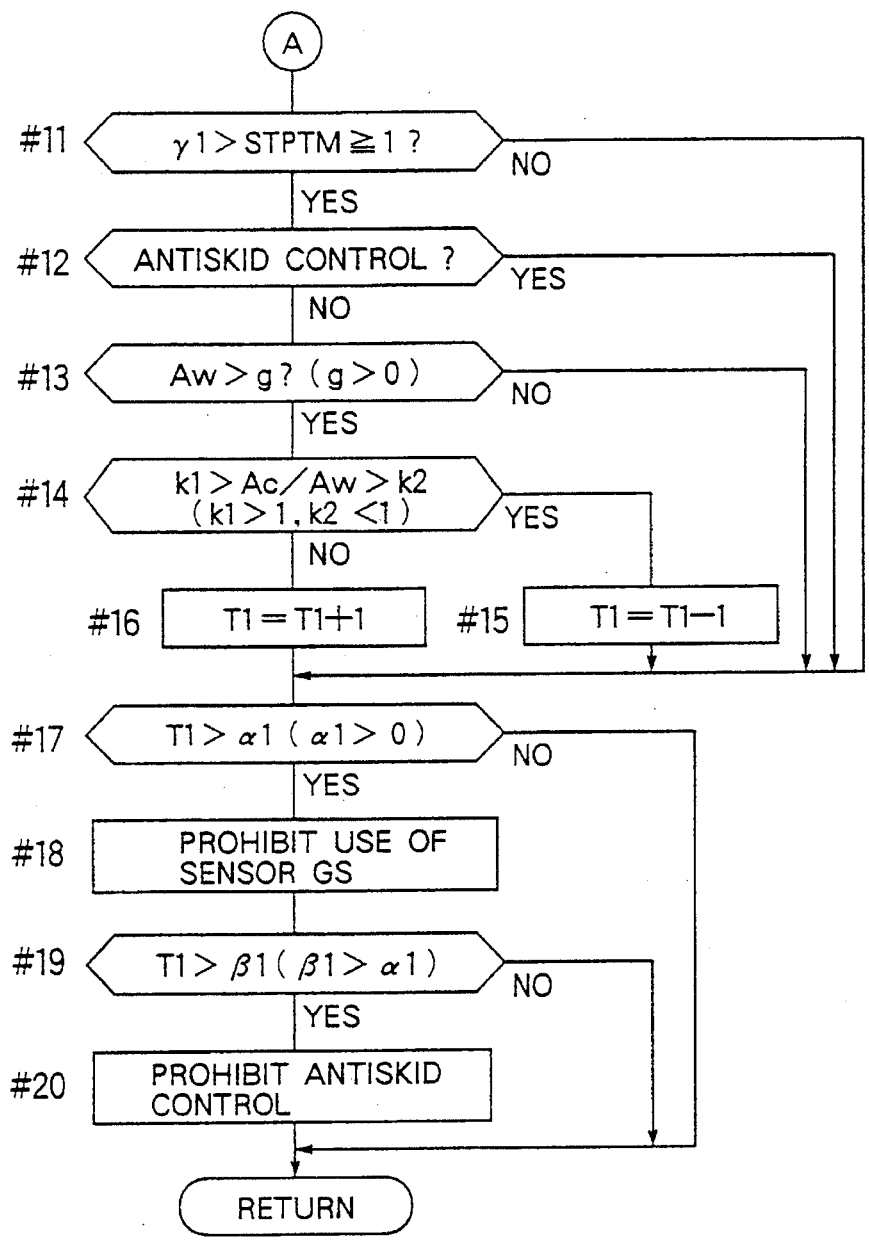

Then, operation of the apparatus K1 is described with reference to flow charts of FIGS. 4 and 5. In this embodiment, processings of FIGS. 4 and 5 are repeated at a predetermined period (control cycle) during a period from start of a power source upon turning on of an ignition switch to turning off of the ignition switch. Initially, if it is found at step #1 that it is an initial control cycle after start of the power source, an initial value of the first integrating value T1 is set to a value $\alpha 3$ smaller than the first predetermined value $\alpha 1$ at step #2. By setting the initial value of the first integrating value T1 as described above, the first integrating value T1 is smaller than the first predetermined value $\alpha 1$ at step #17 in several control cycles after turning on of the ignition switch and thus, the longitudinal acceleration sensor GS is securely used for antiskid control at an initial stage after turning on of the ignition switch.

Then, at step #3, the zero point correcting means COFF reads the sensor output Am of the longitudinal acceleration sensor GS. Subsequently, at step #4, the wheel speed calculating means VCAL calculates the wheel speeds $V_0$, $V_1$, $V_2$ and $V_3$ of the front left, front right, rear left and rear right wheels FL, FR, RL and RR on the basis of pulse signals from the wheel speed sensors $S_0$, $S_1$, $S_2$ and $S_3$. Thereafter, at step #5, the wheel speed selecting means VSLCT calculates the representative wheel speed V on the basis of the equation (1) referred to earlier. Then, at step #6, the estimated vehicle body acceleration calculating means GCELCAL calculates the estimated vehicle body acceleration Aw through linear differential of the representative wheel speed $V_r$. Furthermore at step #7, the zero point correcting means COFF corrects zero point of the sensor output Am of the longitudinal acceleration sensor GS on the basis of the earlier mentioned equation (2) so as to calculate the corrected value Ac of detected vehicle body acceleration.

Processings from step #8 to step #16 are performed by the first comparative arithmetic means $COMP_1$. Initially, at step #8, it is judged based on presence and absence of an input signal from the brake switch BS whether or not the brake pedal 1 is being kicked by the driver, namely, the motor vehicle is being braked. In the case of "YES" at step #8, the program flow proceeds to step #9. On the contrary, in the case of "NO" at step #8, the program flow proceeds to step #10. At step #9, "1" is added to count of a braking timer STPTM for measuring period which has elapsed after start of braking of the motor vehicle. Meanwhile, at step #10, count of the braking timer STPTM is cleared to "0".

At step #11, it is judged whether or not count of the braking timer STPTM falls within a predetermined range, i.e., $\gamma 1 > STPTM \geq 1$. In the case of "YES" at step #11, it is judged that a predetermined period has not elapsed from start of braking of the motor vehicle, so that the program flow proceeds to step #12. On the other hand, in the case of "NO" at step #11, it is judged that the predetermined period has elapsed after start of braking of the motor vehicle, so that the program flow proceeds to step #17 by skipping steps #12–#16 for detecting failures of the longitudinal acceleration sensor GS.

In the first embodiment, failures of the longitudinal acceleration sensor GS are detected only during the predetermined period after start of braking of the motor vehicle for the following reason. Namely, since the zero point correcting means COFF corrects zero point of the sensor output Am of the longitudinal acceleration sensor GS by comparing the sensor output Am and the estimated vehicle body acceleration Aw in each control cycle as described above, this zero point correction corrects also large-gain failure or small-gain failure of the longitudinal acceleration sensor GS. For example, if small-gain failure of the longitudinal acceleration sensor GS happens when the above described method of zero point correction is employed, the sensor output Am of the longitudinal acceleration sensor GS becomes small immediately after start of braking of the motor vehicle. However, since zero point of the sensor output Am is gradually corrected, the sensor output Am exhibits an apparently normal value during last half of braking of the motor vehicle. Accordingly, in the first embodiment, since comparative arithmetic operation for detecting failures of the longitudinal acceleration sensor GS by the first comparative arithmetic means $COMP_1$ is permitted only during the predetermined period after start of braking of the motor vehicle, detection of failures of the longitudinal acceleration sensor GS is not performed in a region where large-gain failure or small-gain failure is corrected by zero point correction so as to be judged as being normal.

At step #12, the first comparative arithmetic means $COMP_1$ judges based on a signal from the antiskid control means ABS whether or not the motor vehicle is being subjected to antiskid control. In the case of "NO" at step #12, the program flow proceeds to step #13. On the other hand, in the case of "YES" at step #12, the program flow proceeds to step #17. Failures of the longitudinal acceleration sensor GS are not detected during antiskid control of the motor vehicle as described above on the following ground. Namely, during antiskid control of the motor vehicle, since behaviors of the wheels are unstable, it is difficult to detect failures of the longitudinal acceleration sensor GS accurately. Then, at step #13, it is judged whether or not the estimated vehicle body acceleration Aw is larger than the positive predetermined value g. In the case of "YES" at step #13, the program flow proceeds to step #14. On the contrary, in the case of "NO" at step #13, the program flow proceeds to step #17. This is because in case the estimated vehicle body acceleration Aw is smaller than the predetermined value g, namely, the motor vehicle is not under sufficient deceleration, it is difficult to detect failures of the longitudinal acceleration sensor GS with sufficiently high precision. Namely, when deceleration of the motor vehicle is insufficient, calculation error is apt to be large and thus, it is necessary to detect failures of the longitudinal acceleration sensor GS by eliminating this region of erroneous detection of failures of the longitudinal acceleration sensor GS.

At step #14, the ratio of the corrected value Ac of detected vehicle body acceleration to the estimated vehicle body acceleration Aw, i.e., (Ac/Aw) is calculated and it is judged whether or not the ratio (Ac/Aw) is smaller than a first predetermined value k1 (k1>1) but larger than a second predetermined value k2 (k2<1), namely, k1>(Ac/Aw)>k2. In the case of "YES" at step #14, it is judged that the estimated vehicle body acceleration Aw and the corrected value Ac of detected vehicle body acceleration coincide with each other, so that the program proceeds to step #15 at which "1" is subtracted from the first integrating value T1. On the contrary, in the case of "NO" at step #14, it is judged that the estimated vehicle body speed Aw and the corrected value Ac of detected vehicle body acceleration do not coincide with each other, namely, the corrected value Ac of detected vehicle body acceleration is far larger or smaller than the estimated vehicle body acceleration Aw, so that the program flow proceeds to step #16 at which "1" is added to the first integrating value T1. Meanwhile, the first and second predetermined values k1 and k2 are determined by specifications of the longitudinal acceleration sensor GS such as scatter of quality of the longitudinal acceleration sensor GS at the time of its production.

Processings from step #17 to step #20 are performed by the fail-safe means FLSF. Initially, at step #17, it is judged whether or not the first integrating value T1 is larger than the positive first predetermined value α1. In the case of "YES" at step #17, since this finding is insufficient for concluding that the longitudinal acceleration sensor GS fails but a state in which the estimated vehicle body acceleration Aw and the corrected value Ac of detected vehicle body acceleration do not coincide with each other has lasted for a relatively long period, it is judged that the longitudinal acceleration sensor GS has symptom of failures, so that the program flow proceeds to step #18 at which the first prohibition signal $D_1$ prohibiting use of the corrected value Ac of detected vehicle body acceleration based on output from the longitudinal acceleration sensor GS is outputted to the antiskid control means ABS. In response to the first prohibition signal $D_1$, the antiskid control means ABS performs antiskid control by using the estimated vehicle body acceleration Aw without using the corrected value Ac of detected vehicle body acceleration.

At step #19, it is judged whether or not the first integrating value T1 is larger than the second predetermined value β1 greater than the first predetermined value α1. In the case of "YES" at step #19, since the state in which the estimated vehicle body acceleration Aw and the corrected value Ac of detected vehicle body acceleration do not coincide with each other has lasted for a sufficiently long period and thus, it is judged that the longitudinal acceleration sensor GS fails, so that the program flow proceeds to step #20 at which the second prohibition signal $D_2$ prohibiting antiskid control is outputted to the antiskid control means ABS.

Thus, in the apparatus K1 for detecting failures of the longitudinal acceleration sensor GS, according to the first embodiment of the present invention, if the ratio (Ac/Aw) of the corrected value Ac of detected vehicle body acceleration to the estimated vehicle body acceleration Aw falls out of the range bounded by the first and second predetermined values k1 and k2, it is judged that the corrected value Ac of detected vehicle body acceleration is far larger or smaller than the estimated vehicle body acceleration Aw, so that "1" is added to the first integrating value T1. On the other hand, when the ratio (Ac/Aw) falls within the range bounded by the first and second predetermined values k1 and k2, "1" is subtracted from the first integrating value T1. Therefore, not only in the case of small-gain failure of the longitudinal acceleration sensor GS but in the case of large-gain failure of the longitudinal acceleration sensor GS, "1" is added to the first integrating value T1. Accordingly, by comparing the first integrating value T1 with the first predetermined value α1 or the second predetermined value β1, it is possible to detect large-gain failure, small-gain failure and their symptoms of the longitudinal acceleration sensor GS.

Figure 6:
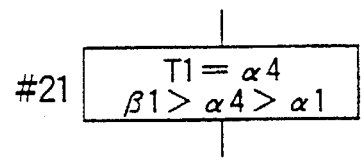
FIG. 6 is a flow chart showing a modification of the flow chart of FIG. 4.

Meanwhile, in the first embodiment, step #2 for setting an initial value of the first integrating value T1 may be replaced by step #21 shown in FIG. 6. At step #21, the initial value of the first integrating value T1 is set to a value α4 intermediate between the first and second predetermined values α1 and β1, namely, β1>α4>α1. In this case, in several control cycles after turning on of the ignition switch, namely, during a predetermined period after start of running of the motor vehicle, use of the longitudinal acceleration sensor GS is prohibited at steps #17 and #18 even when the longitudinal acceleration sensor GS is functioning normally. After subsequent repetition of several control cycles, the first integrating value T1 is reduced to not more than the first predetermined value α1, i.e., T1 ≦α1 and thus, prohibition of use of the longitudinal acceleration sensor GS is withdrawn. On the other hand, in case the longitudinal acceleration sensor GS has failures essentially, the first integrating value T1 is further increased through subsequent repetition of several control cycles. Therefore, if the initial value of the first integrating value T1 is set as described above, use of the longitudinal acceleration sensor GS can be prohibited positively from a time point immediately after start of the motor vehicle in case the longitudinal acceleration sensor GS has failures.

Figure 7:
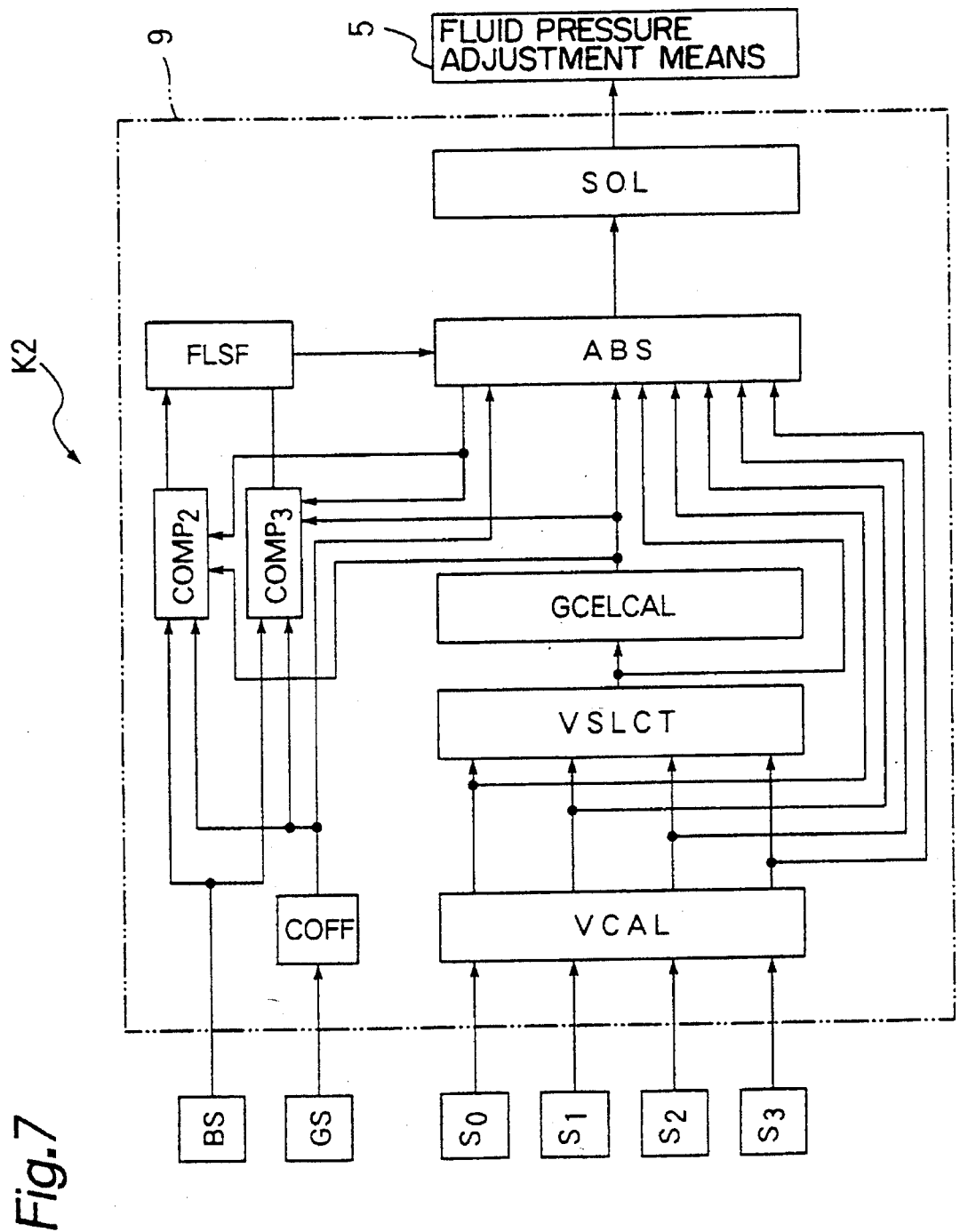
FIG. 7 is a schematic view of an apparatus for detecting failures of a longitudinal acceleration sensor, according to a second embodiment of the present invention.

Then, an apparatus K2 for detecting failures of the longitudinal acceleration sensor GS, according to a second embodiment of the present invention is described with reference to FIG. 7. As shown in FIG. 7, the controller 9 of the apparatus K2 includes second and third comparative arithmetic means $COMP_2$ and $COMP_3$ in place of the first comparative arithmetic means $COMP_1$ of the apparatus K1. In the same manner as the first comparative arithmetic means $COMP_1$ of the apparatus K1, signals from the brake switch BS, the zero point correcting means COFF and the estimated vehicle body acceleration calculating means GCELCAL are inputted to the second and third comparative arithmetic means $COMP_2$ and $COMP_3$. When the estimated vehicle body acceleration Aw is larger than a predetermined value, the second comparative arithmetic means $COMP_2$ calculates a ratio (Ac/Aw) of the corrected value Ac of detected vehicle body acceleration to the estimated vehicle body acceleration Aw. If this ratio (Ac/Aw) falls within a predetermined range, a predetermined value is added to a second integrating value T2.

On the other hand, when the estimated vehicle body acceleration Aw is larger than the predetermined value, the third comparative calculating means $COMP_3$ calculates the ratio (Ac/Aw) of the corrected value Ac of detected vehicle body acceleration to the estimated vehicle body acceleration Aw. When this ratio (Ac/Aw) falls out of the predetermined range, the predetermined value is added to a third integrating value T3. Since other constructions of the apparatus K2 are similar to those of the apparatus K1, the description is abbreviated for the sake of brevity.

Then, operation of the apparatus K2 is described with reference to flow charts of FIGS. 8 and 9. Initially, if it is found at step #1 that it is an initial control cycle after start of the power source, an initial value of the second integrating value T2 is set to t2 and an initial value of the third integrating value T3 is set to t3. These initial values t2 and t3 are set such that their ratio (t3/t2) falls between third and fourth predetermined values $\alpha 2$ and $\beta 2$ ($\beta 2 > \alpha 2$) to be described later. By setting the initial values of the second and third integrating values T2 and T3 as described above, use of the longitudinal acceleration sensor GS is prohibited at steps #37 and #38 during a predetermined period after start of running of the motor vehicle even if the longitudinal acceleration sensor GS is functioning normally. Meanwhile, if the longitudinal acceleration sensor GS is functioning normally, the second integrating value T2 becomes larger than the third integrating value T3 through subsequent repetition of several control cycles and thus, prohibition of use of the longitudinal acceleration sensor GS is withdrawn. On the other hand, in case the longitudinal acceleration sensor GS has failures essentially, the third integrating value T3 is further increased through subsequent repetition of several control cycles. Therefore, by setting the initial values t2 and t3 of the second and third integrating values T2 and T3 as described above, use of the longitudinal acceleration sensor GS can be prohibited positively from a time point immediately after start of the motor vehicle in case the longitudinal acceleration sensor GS has failures.

Figure 8:
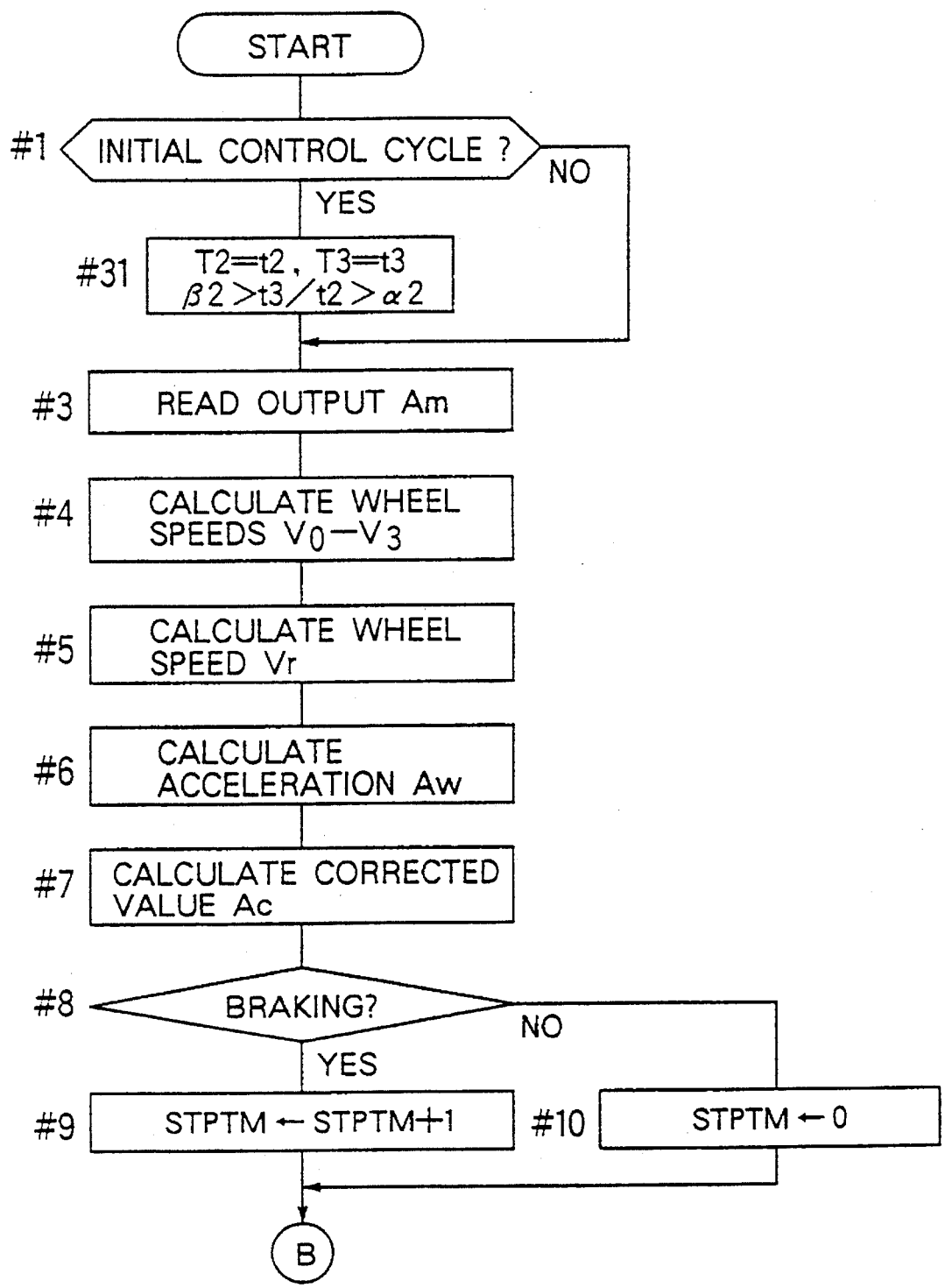
FIGS. 8 and 9 are flow charts showing operational sequences of the apparatus of FIG. 7.
Figure 9:
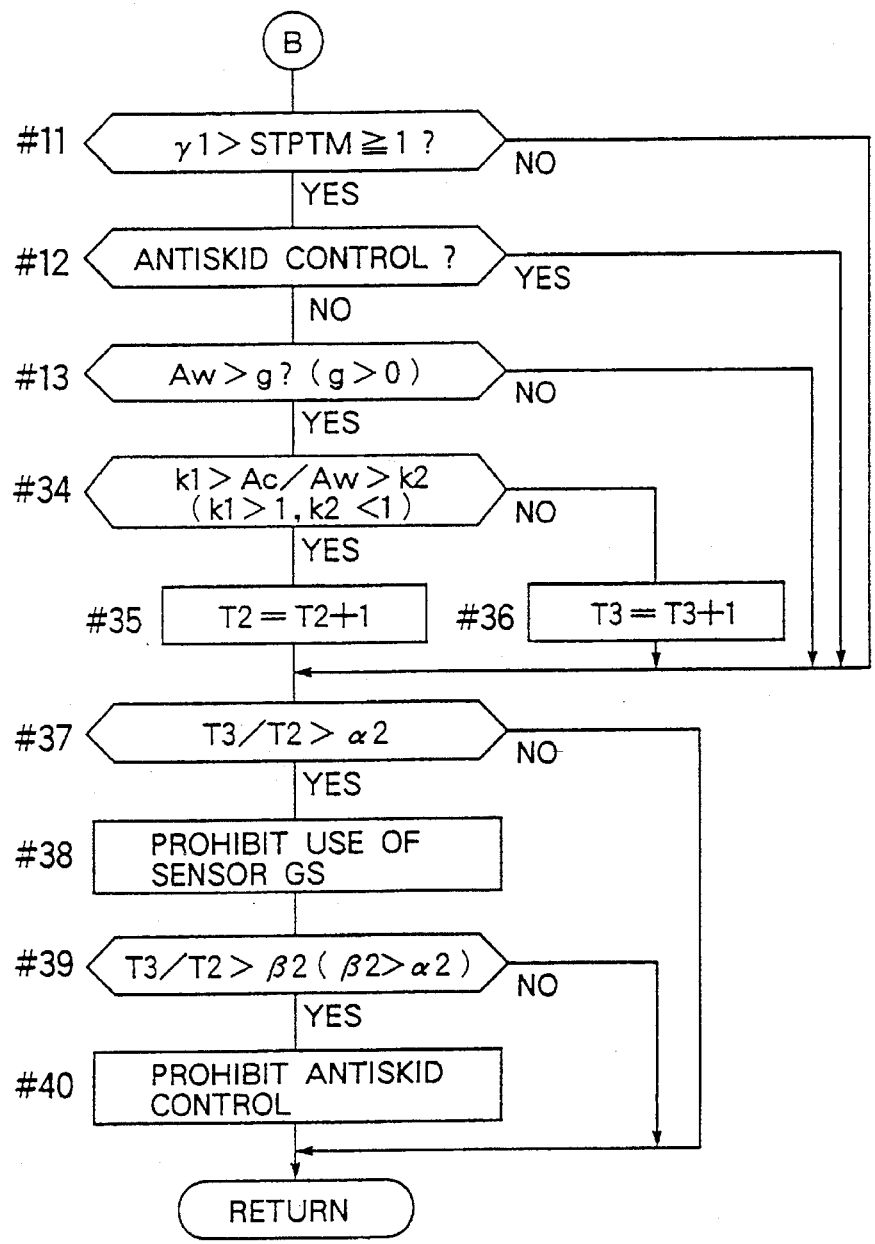

Processings from step #3 of FIG. 8 to step #13 of FIG. 9 are identical with those of FIGS. 4 and 5 of the first embodiment. At step #34 of FIG. 9, the ratio (Ac/Aw) of the corrected value Ac of detected vehicle body acceleration to the estimated vehicle body acceleration Aw is calculated and it is judged whether or not the ratio (Ac/Aw) is smaller than the first predetermined value k1 but larger than the second predetermined value k2. In the case of "YES" at step #34, it is judged that the corrected value Ac of detected vehicle body acceleration coincides with the estimated vehicle body acceleration Aw, so that the program flow proceeds to step #35. On the other hand, in the case of "NO" at step #34, it is judged that the corrected value Ac of detected vehicle body acceleration is far larger or smaller than the estimated vehicle body acceleration Aw, so that the program flow proceeds to step #36. At step #35, "1" is added to the second integrating value T2. Meanwhile, at step #36, "1" is added to the third integrating value T3.

Subsequently, at step #37, it is judged whether or not a ratio (T3/T2) of the third integrating value T3 to the second integrating value T2 is larger than the third predetermined value $\alpha 2$. This ratio (T3/T2) represents a ratio of a period during which the corrected value Ac of detected vehicle body acceleration does not coincide with the estimated vehicle body acceleration Aw to a period during which the corrected value Ac of detected vehicle body acceleration coincides with the estimated vehicle body acceleration Aw. Thus, in case the ratio (T3/T2) is larger than the third predetermined value $\alpha 2$, this finding is insufficient for concluding that the longitudinal acceleration sensor GS fails but a state in which the corrected value Ac of detected vehicle body acceleration and the estimated vehicle body acceleration Aw do not coincide with each other has lasted for a relatively long period and thus, it is judged that the longitudinal acceleration sensor GS has symptom of failures, so that the program flow proceeds to step #38. At step #38, the first prohibition signal $D_1$ prohibiting use of the corrected value Ac of detected vehicle body acceleration based on output from the longitudinal acceleration sensor GS is outputted to the antiskid control means ABS.

Then, at step #39, it is judged whether or not the ratio (T3/T2) of the third integrating value T3 to the second integrating value T2 is larger than the fourth predetermined value $\beta 2$. In the case of "YES" at step #39, it is judged that the corrected value Ac of detected vehicle body acceleration and the estimated vehicle body acceleration Aw have not been coincident with each other for a long period sufficient for concluding that the longitudinal acceleration sensor GS fails, so that the program flow proceeds to step #40 at which the second prohibition signal $D_2$ prohibiting antiskid control is outputted to the antiskid control means ABS.

In the second embodiment, failures of the longitudinal acceleration sensor GS are detected on the basis of the ratio (T3/T2) of the third integrating value T3 subjected to addition when the corrected value Ac of detected vehicle body acceleration is far larger or smaller than the estimated vehicle body acceleration Aw to the second integrating value T2 subjected to addition when the corrected value Ac of detected vehicle body acceleration coincides with the estimated vehicle body acceleration Aw. Therefore, not only in the case of large-gain failure of the longitudinal acceleration sensor GS but in the case of small-gain failure of the longitudinal acceleration sensor GS, it is possible to detect failures of the longitudinal acceleration sensor GS positively.

Figure 10:
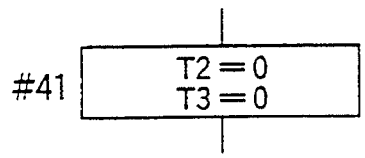
FIG. 10 is a flow chart showing a modification of the flow chart of FIG. 8.

In the second embodiment, step #31 of FIG. 8 may be replaced by step #41 of FIG. 10. At step #41, the initial value of the second integrating value T2 is set to "0" and the initial value of the third integrating value T3 is also set to "0". If the initial values of the second and third integrating values T2 and T3 are set as described above when the longitudinal acceleration sensor GS is functioning normally, the second integrating value T2 is subjected to addition at step #35 and thus, the longitudinal acceleration sensor GS can be used positively from a time point immediately after start of the motor vehicle.

Figure 11:
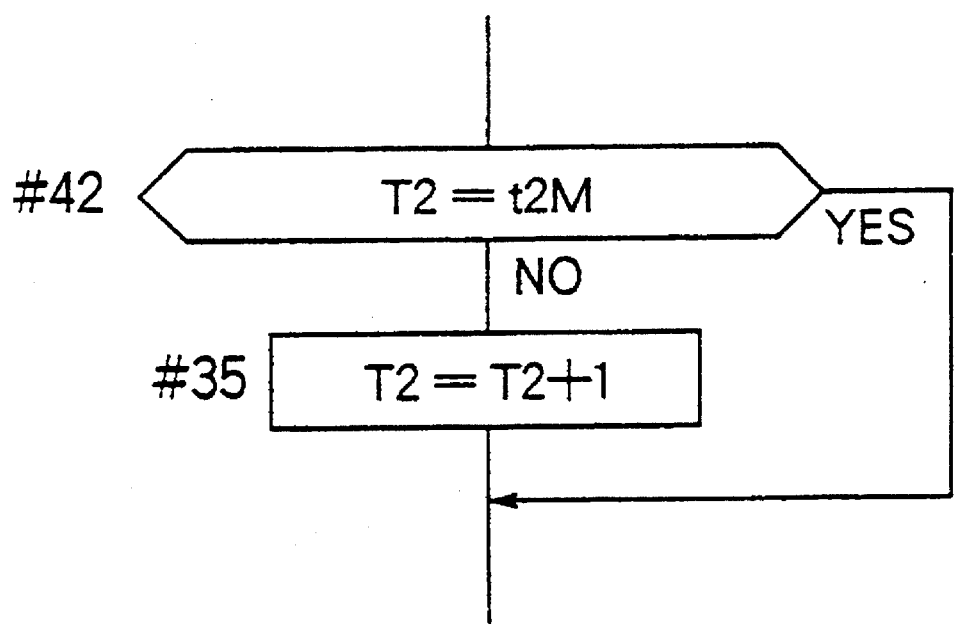
FIG. 11 is a flow chart showing a modification of the flow chart of FIG. 9.

Meanwhile, in the second embodiment, step #35 of FIG. 9 may be replaced by steps #42 and #35 of FIG. 11. In this case, the second integrating value T2 is subjected to addition up to a maximum value t2M. When the longitudinal acceleration sensor GS reaches an abnormal state after a normal state of the longitudinal acceleration sensor GS has lasted for a long time in case an upper limit for the second integrating value T2 is set as described above, the third integrating value T3 is subjected to addition. Therefore, time period required for the ratio (T3/T2) to exceed the third predetermined value α2 or the fourth predetermined value β2 is shortened and thus, failures of the longitudinal acceleration sensor GS can be detected promptly.

Figure 12:
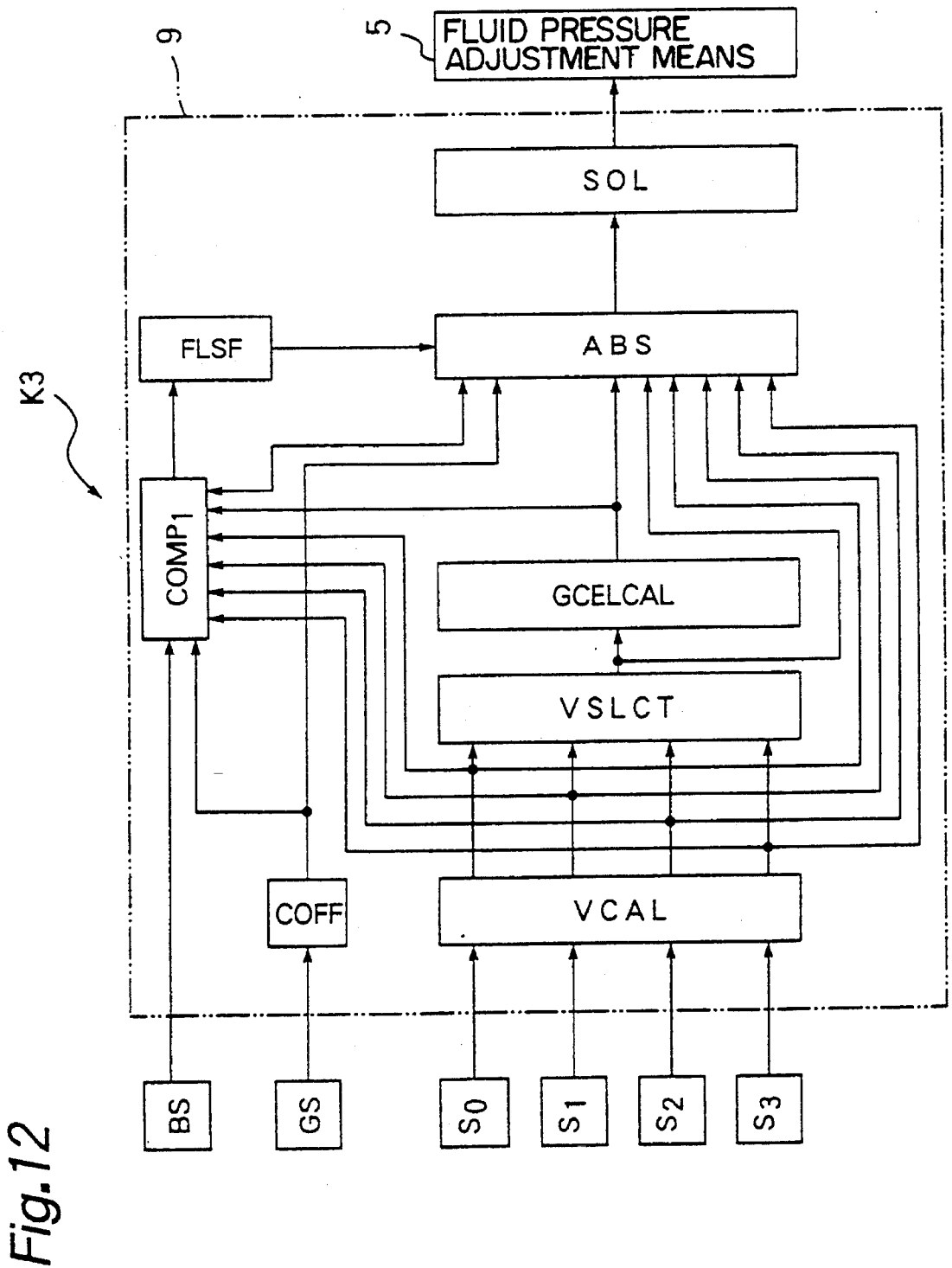
FIG. 12 is a schematic view of an apparatus for detecting failures of a longitudinal acceleration sensor, according to a third embodiment of the present invention.

Then, an apparatus K3 for detecting failures of the longitudinal acceleration sensor GS, according to a third embodiment of the present invention is described with reference to FIG. 12. In the apparatus K3, signals from the estimated vehicle body acceleration calculating means GCELCAL, the zero point correcting means COFF, the brake switch BS and the antiskid control means ABS are inputted to the first comparative arithmetic means $COMP_1$ in the same manner as the first embodiment. Furthermore, in the apparatus K3, the wheel speeds $V_0$ to $V_3$ from the wheel speed calculating means VCAL are also inputted to the first comparative arithmetic means $COMP_1$.

The first comparative arithmetic means $COMP_1$ includes a first means for detecting from the wheel speeds $V_0$ to $V_3$ whether or not the motor vehicle is turning. When the motor vehicle is not turning, the first comparative arithmetic means $COMP_1$ performs addition or subtraction for the first integrating value T1. On the other hand, when the motor vehicle is turning, the first comparative arithmetic means $COMP_1$ does not perform addition or subtraction for the first integrating value T1. The first comparative arithmetic means $COMP_1$ further includes a second means for judging from the wheel speeds $V_0$ to $V_3$ whether or not the front left, front right, rear left and rear right wheels FL, FR, RL and RR are spinning. When the second means has judged that the front left, front right, rear left and rear right wheels FL, FR, RL and RR are not spinning, the first comparative arithmetic means $COMP_1$ performs addition or subtraction for the first integrating value T1. On the contrary, when the front left, front right, rear left and rear right wheels FL, FR, RL and RR are spinning, the first comparative arithmetic means $COMP_1$ does not perform addition or subtraction for the first integrating value T1. Since other constructions of the apparatus K3 are similar to those of the apparatus K1, the description is abbreviated for the sake of brevity.

Figure 13B:
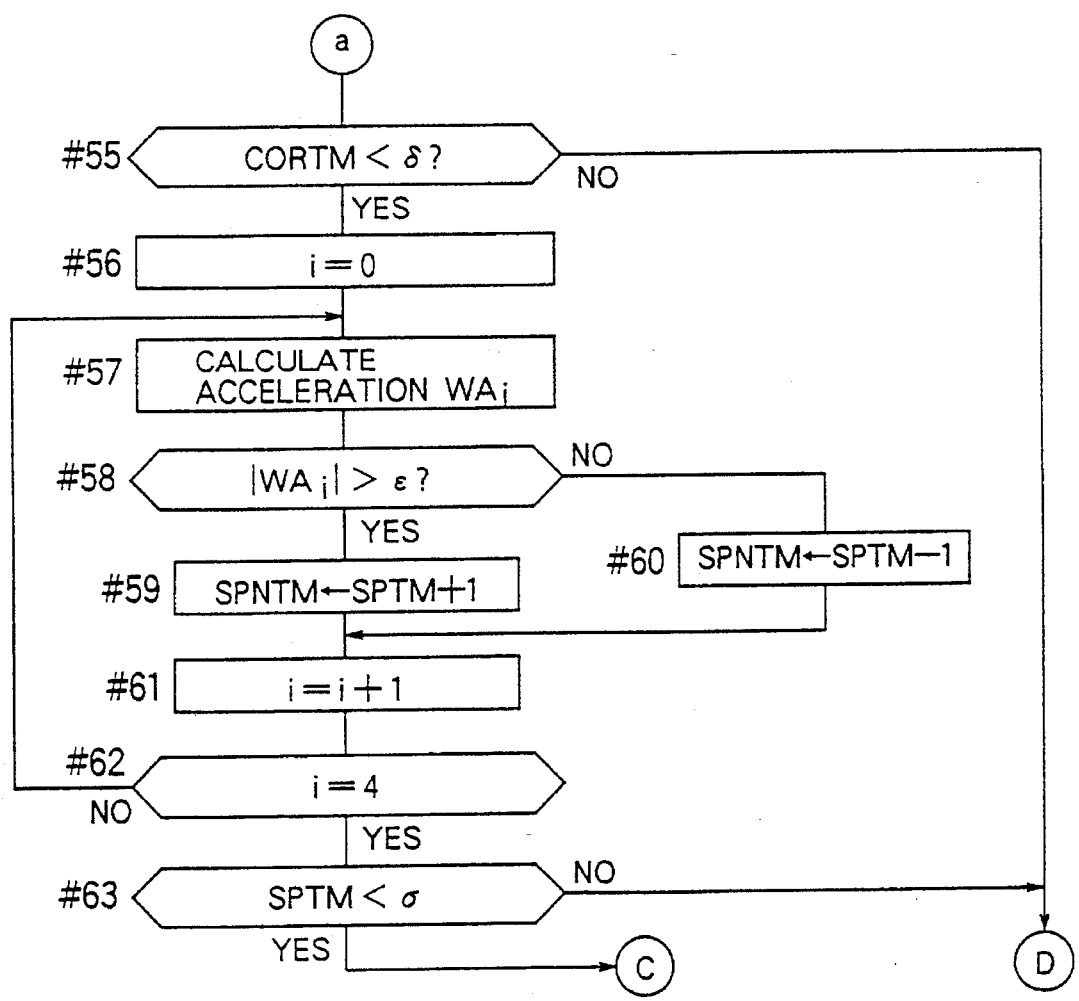

Then, operation of the apparatus K3 is described with reference to flow charts of FIGS. 13A and 13B and 14A and 14B. Processings from step #1 to step #7 in FIG. 13A are identical with those of FIG. 4. At step #51, it is judged if not only the wheel speed $V_1$ of the front right wheel FR is larger than the wheel speed $V_0$ of the front left wheel FL but the wheel speed $V_3$ of the rear right wheel RR is larger than the wheel speed $V_2$ of the rear left wheel RL. In the case of "YES" at step #51, namely, when both of the following equations (3) and (4) are satisfied, the program flow proceeds to step #52. On the other hand, in the case of "NO" at step #51, namely, when at least one of the equations (3) and (4) is not satisfied, the program flow proceeds to step #53.

$$V_1 > V_0 \quad (3)$$

$$V_3 > V_2 \quad (4)$$

At step #53, it is judged if not only the wheel speed $V_0$ of the front left wheel FL is larger than the wheel speed $V_1$ of the front right wheel FR and the wheel speed $V_2$ of the rear left wheel RL is larger than the wheel speed $V_3$ of the rear right wheel RR. In the case of "YES" at step #53, namely, when both of the following equations (5) and (6) are satisfied, the program flow proceeds to step #52. On the contrary, in the case of "NO" at step #53, namely, when at least one of the equations (5) and (6) is not satisfied, the program flow proceeds to step #54.

$$V_0 > V_1 \quad (5)$$

$$V_2 > V_3 \quad (6)$$

At step #52, "1" is added to count of a turning timer CORTM for measuring duration of turning of the motor vehicle. On the other hand, at step #54, "1" is subtracted from count of the turning timer CORTM.

Then, at step #55, it is judged whether or not count of the turning timer CORTM is smaller than a predetermined value δ. In the case of "YES" at step #55, it is judged that the motor vehicle is not turning, in other words, the motor vehicle is running straightforwardly, so that the program flow proceeds to step #56. On the other hand, in the case of "NO" at step #55, it is judged that the motor vehicle is turning, so that the program flow proceeds to step #17 without performing addition or subtraction for the first integrating value T1.

When the motor vehicle is turning, failures of the longitudinal acceleration sensor GS are not detected as described above because it is difficult to accurately detect failures of the longitudinal acceleration sensor GS during turning of the motor vehicle. Namely, even if the longitudinal acceleration sensor GS is functioning normally, output value of the longitudinal acceleration sensor GS during turning of the motor vehicle may become smaller or larger than actual acceleration of the motor vehicle according to mounting position of the longitudinal acceleration sensor GS relative to the vehicle body. Meanwhile, the wheel speeds $V_0$ to $V_3$ of the wheels FL, FR, RL and RR disposed outside a curved locus drawn by the motor vehicle during its turning become larger than speed of center of gravity of the motor vehicle, while the wheel speeds $V_0$ to $V_3$ of the wheels FL, FR, RL and RR disposed inside the locus become smaller than speed of center of gravity of the motor vehicle. Therefore, the estimated vehicle body acceleration Aw calculated from the wheel speeds $V_0$ to $V_3$ does not approximate to actual vehicle body acceleration exactly. Consequently, during turning of the motor vehicle, it is difficult to detect failures of the longitudinal acceleration sensor GS at high accuracy.

Processings from step #56 to step #62 are repeated for each of the wheels FL, FR, RL and RR. Initially, at step #57, wheel acceleration $WA_i$ (i=0-3) of the wheel FL, FR, RL and RR is calculated through linear differential of the wheel speeds $V_0$ to $V_3$. Then, at step #58, it is judged whether or not absolute value of the wheel acceleration $WA_i$ is larger than a positive predetermined value ε. In the case of "YES" at step #58, the program flow proceeds to step #59. On the other hand, in the case of "NO" at step #58, the program flow proceeds to step #60. At step #59, "1" is added to count of a spin timer SPTM for inspecting spin of the wheels FL, FR, RL and RR. Meanwhile, at step #60, "1" is subtracted from count of the spin timer SPTM.

After the processings from step #56 to step #62 have been repeated for the wheels FL, FR, RL and RR as described above, it is judged at step #63 whether or not count of the spin timer SPTM is smaller than a positive predetermined value σ. In the case of "YES" at step #63, it is judged that the wheels FL, FR, RL and RR are not spinning, so that the program flow proceeds to step #8. On the other hand, in the case of "NO" at step #63, it is judged that the wheels FL, FR, RL and RR are spinning, so that the program flow proceeds to step #17 without performing addition or subtraction for the first integrating value T1.

Figure 14A:
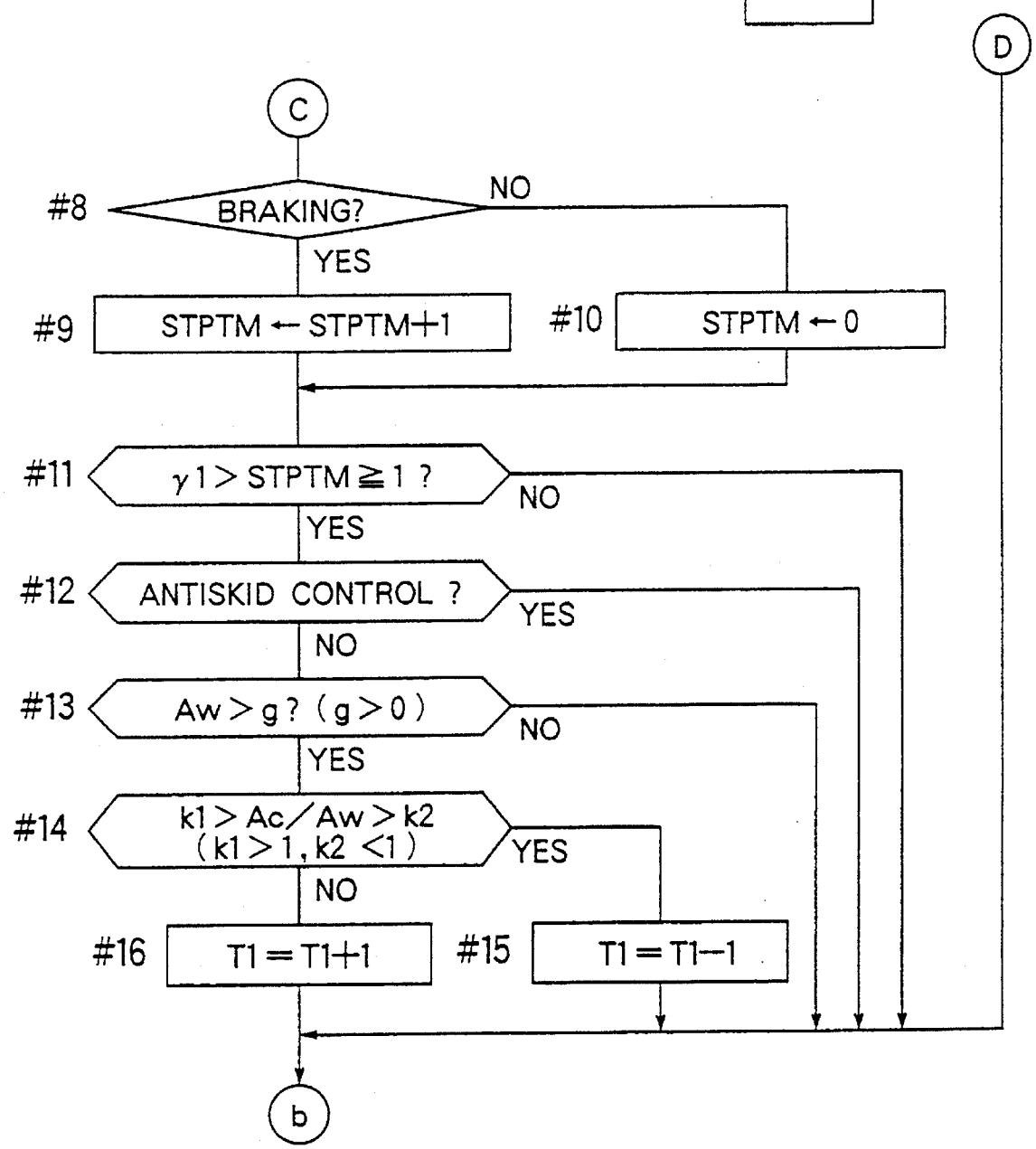
Figure 14B:
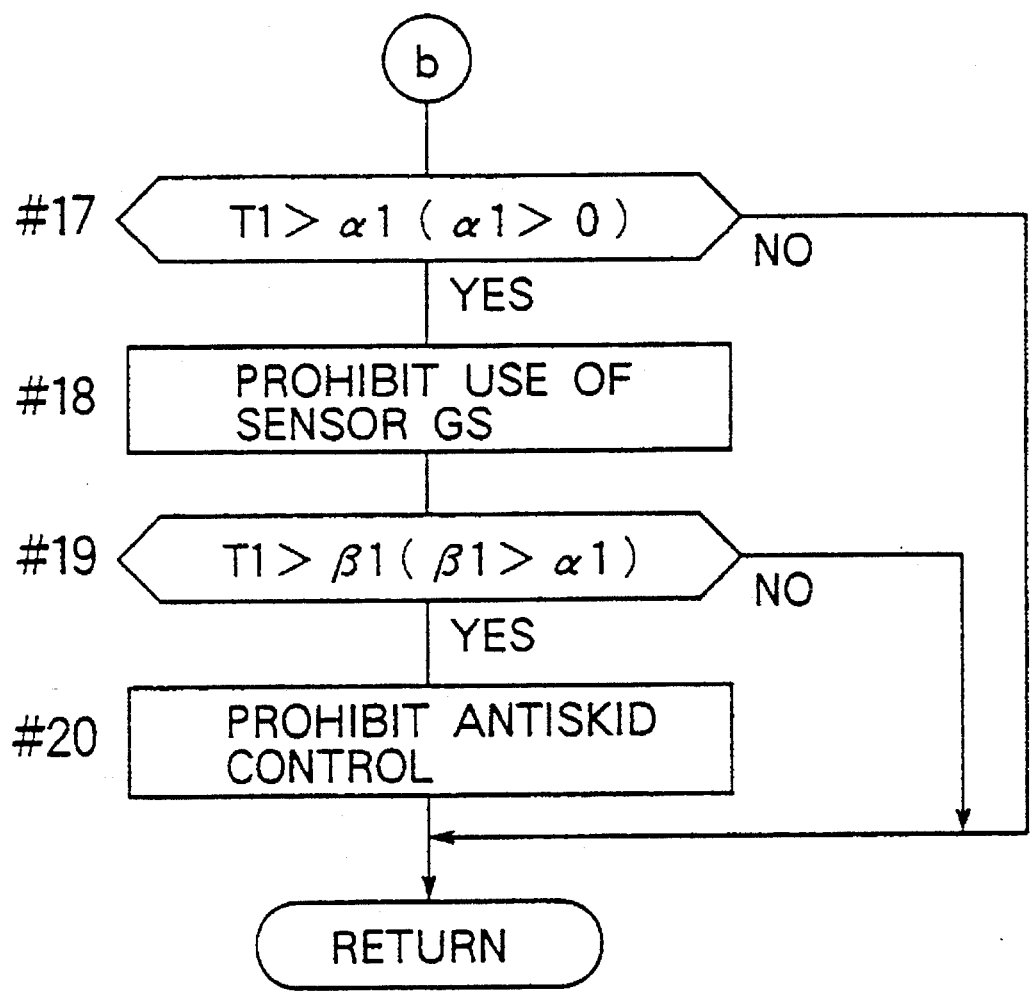

When the wheels FL, FR, RL and RR are spinning, failures of the longitudinal acceleration sensor GS are not detected as described above because it is difficult to accurately detect failures of the longitudinal acceleration sensor GS during spinning of the wheels FL, FR, RL and RR. Namely, when the wheels FL, FR, RL and RR are spinning, the estimated vehicle body acceleration Aw calculated from the wheel speeds $V_0$ to $V_3$ does not approximate to actual vehicle body acceleration exactly. Accordingly, it is impossible to accurately detect failures of the longitudinal acceleration sensor-GS from the ratio (Ac/Aw) of the corrected value Ac of detected vehicle body acceleration to the estimated vehicle body acceleration Aw. Processings from step #8 to step #20 of FIGS. 14A and 14B are identical with those of FIGS. 4 and 5.

In the apparatus K3, since failures of the longitudinal acceleration sensor GS are detected only when not only the motor vehicle is not turning but the wheels FL, FR, RL and RR are not spinning, failures of the longitudinal acceleration sensor GS can be detected more accurately. Other processings of the apparatus K3 are identical with those of the apparatus K1.

Figure 15:
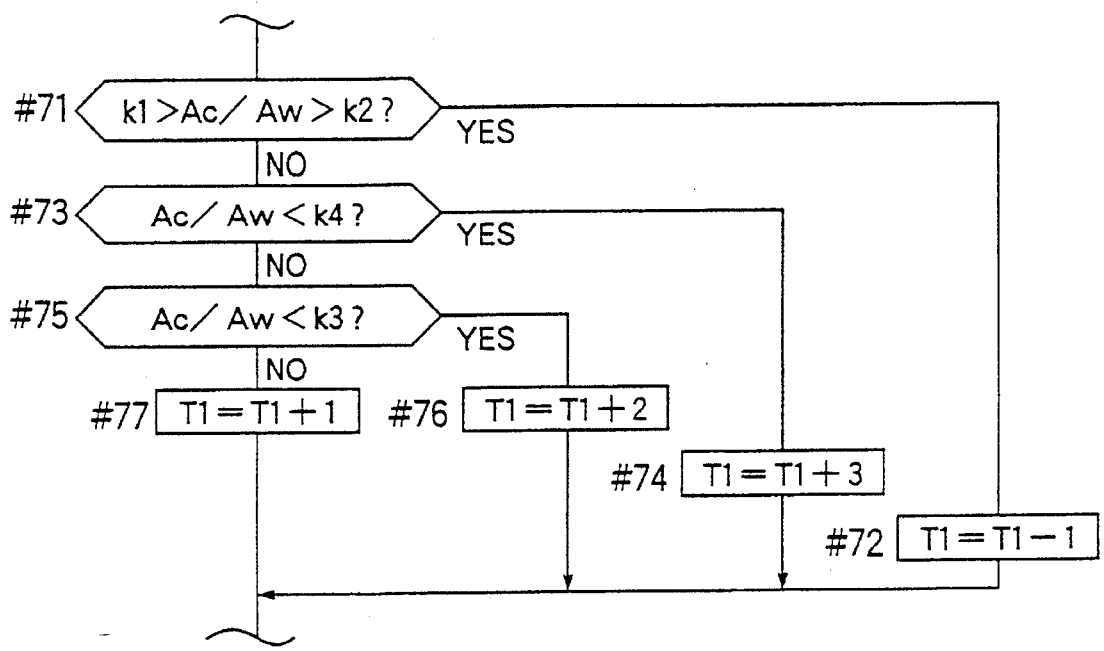
FIG. 15 is a flow chart showing a modification of the first and third embodiments of the present invention.

Steps #14 to #16 of the first and third embodiments may be replaced by steps #71 to #77 shown in FIG. 15. At step #14, it is judged whether or not the ratio (Ac/Aw) of the corrected value Ac of detected vehicle body acceleration to the estimated vehicle body acceleration Aw is smaller than the first predetermined value k1 but larger than the second predetermined value k2. In the case of "YES" at step #14, "1" is subtracted from the first integrating value T1 at step #15. On the other hand, in the case of "NO" at step #14, "1" is added to the first integrating value T1 at step #16. However, at steps #71 to #77, if the ratio (Ac/Aw) is not more than the second predetermined value k2, a value selected from a plurality of addends in accordance with value of the ratio (Ac/Aw) is added to the first integrating value T1. Initially, at step #71, it is judged whether or not the ratio (Ac/Aw) is smaller than the first predetermined value k1 but larger than the second predetermined value k2. In the case of "YES" at step #71, "1" is subtracted from the first integrating value T1 at step #72. On the contrary, in the case of "NO" at step #71, it is judged at step #73 whether or not the ratio (Ac/Aw) is smaller than a fourth predetermined value k4. In the case of "YES" at step #73, the program flow proceeds to step #74 at which "3" is added to the first integrating value T1. In the case of "NO" at step #73, the program flow proceeds to step #75 at which it is judged whether or not the ratio (Ac/Aw) is smaller than a third predetermined value k3. In the case of "YES" at step #75, the program flow proceeds to step #76 at which "2" is added to the first integrating value T1. In the case of "NO" at step #75, the program flow proceeds to step #77 at which "1" is added to the first integrating value T1. The second, third and fourth predetermined values k2, k3 and k4 are set so as to satisfy relation of (k4 <k3<k2).

As described above, in case the ratio (Ac/Aw) is not more than the second predetermined value k2, a larger value selected from a plurality of the addends is added to the first integrating value T1 as the ratio (Ac/Aw) becomes smaller. Therefore, if the corrected value Ac of detected vehicle body acceleration is far smaller than the estimated vehicle body acceleration Aw, addition for the first integrating value T1 is performed promptly and thus, a decision on prohibition of use of the longitudinal acceleration sensor GS and a decision on prohibition of antiskid control can be made early. Accordingly, when processings from step #71 to step #77 are performed, it is possible to detect failures of the longitudinal acceleration sensor GS earlier in case degree of small-gain failure of the longitudinal acceleration sensor GS, which adversely affects the system seriously, especially, increase of stopping distance is high.

Figure 16:
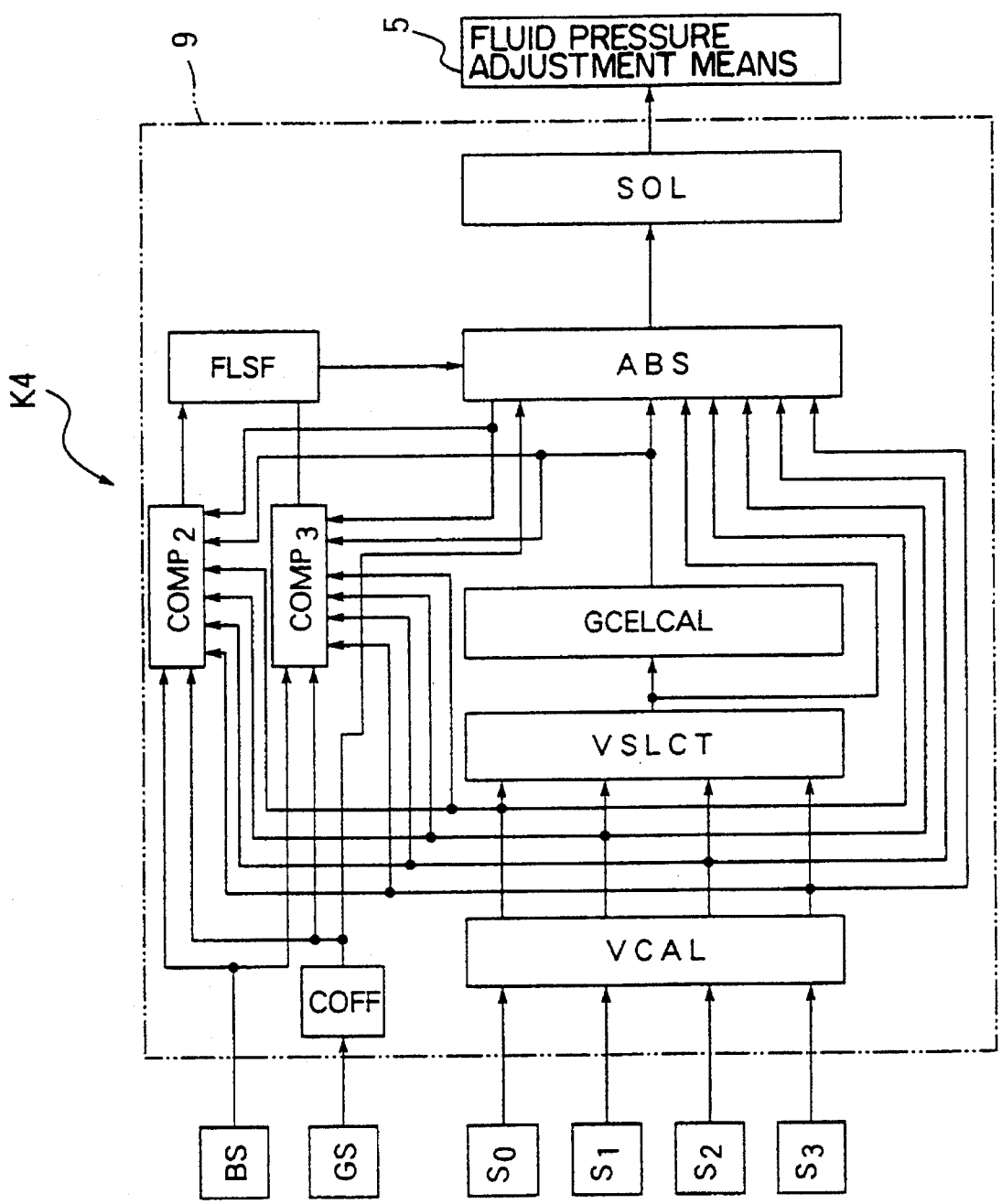
FIG. 16 is a schematic view of an apparatus for detecting failures of a longitudinal acceleration sensor, according to a fourth embodiment of the present invention.

Then, an apparatus K4 for detecting failures of the longitudinal acceleration sensor GS, according to a fourth embodiment of the present invention is described with reference to FIG. 16. As shown in FIG. 16, in the apparatus K4, signals from the estimated vehicle body acceleration calculating means GCELCAL, the zero point correcting means COFF, the brake switch BS and the antiskid control means ABS are inputted to the second and third comparative arithmetic means $COMP_2$ and $COMP_3$ in the same manner as the second embodiment. Furthermore, in the apparatus K4, the wheel speeds $V_0$ to $V_3$ from the wheel speed calculating means VCAL are also inputted to the second and third comparative arithmetic means $COMP_2$ and $COMP_3$.

The second comparative arithmetic means $COMP_2$ detects from the wheel speeds $V_0$ to $V_3$ whether or not the motor vehicle is turning. When the motor vehicle is turning, the second comparative arithmetic means $COMP_2$ performs addition for the second integrating value T2. On the other hand, when the motor vehicle is turning, the second comparative arithmetic means $COMP_2$ does not perform this processing. Meanwhile, the second comparative arithmetic means $COMP_2$ judges from the wheel speeds $V_0$ to $V_3$ whether or not the wheels FL, FR, RL and RR are spinning. When judging that the wheels FL, FR, RL and RR are not spinning, the second comparative arithmetic means $COMP_2$ performs addition for the second integrating value T2. On the contrary, when judging that the wheels FL, FR, RL and RR are spinning, the second comparative arithmetic means $COMP_2$ does not perform this processing.

Likewise, the third comparative arithmetic means $COMP_3$ detects from the wheel speeds $V_0$ to $V_3$ whether or not the motor vehicle is turning. When the motor vehicle is not turning, the third comparative arithmetic means $COMP_3$ performs addition for the third integrating value T3. On the contrary, when the motor vehicle is turning, the third comparative arithmetic means $COMP_3$ does not perform this processing. Meanwhile, the third comparative arithmetic means $COMP_3$ judges from the wheel speeds $V_0$ to $V_3$ whether or not the wheels FL,FR, RL and RR are spinning. When judging that the wheels FL, FR, RL and RR are not spinning, the third comparative arithmetic means $COMP_3$ performs addition for the third integrating value T3. On the contrary, when judging that the wheels FL, FR, RL and RR are spinning, the third comparative arithmetic means COMP does not perform this processing. Since other constructions of the apparatus K4 are similar to those of the apparatus K2, the description is abbreviated for the sake of brevity.

Figure 17A:
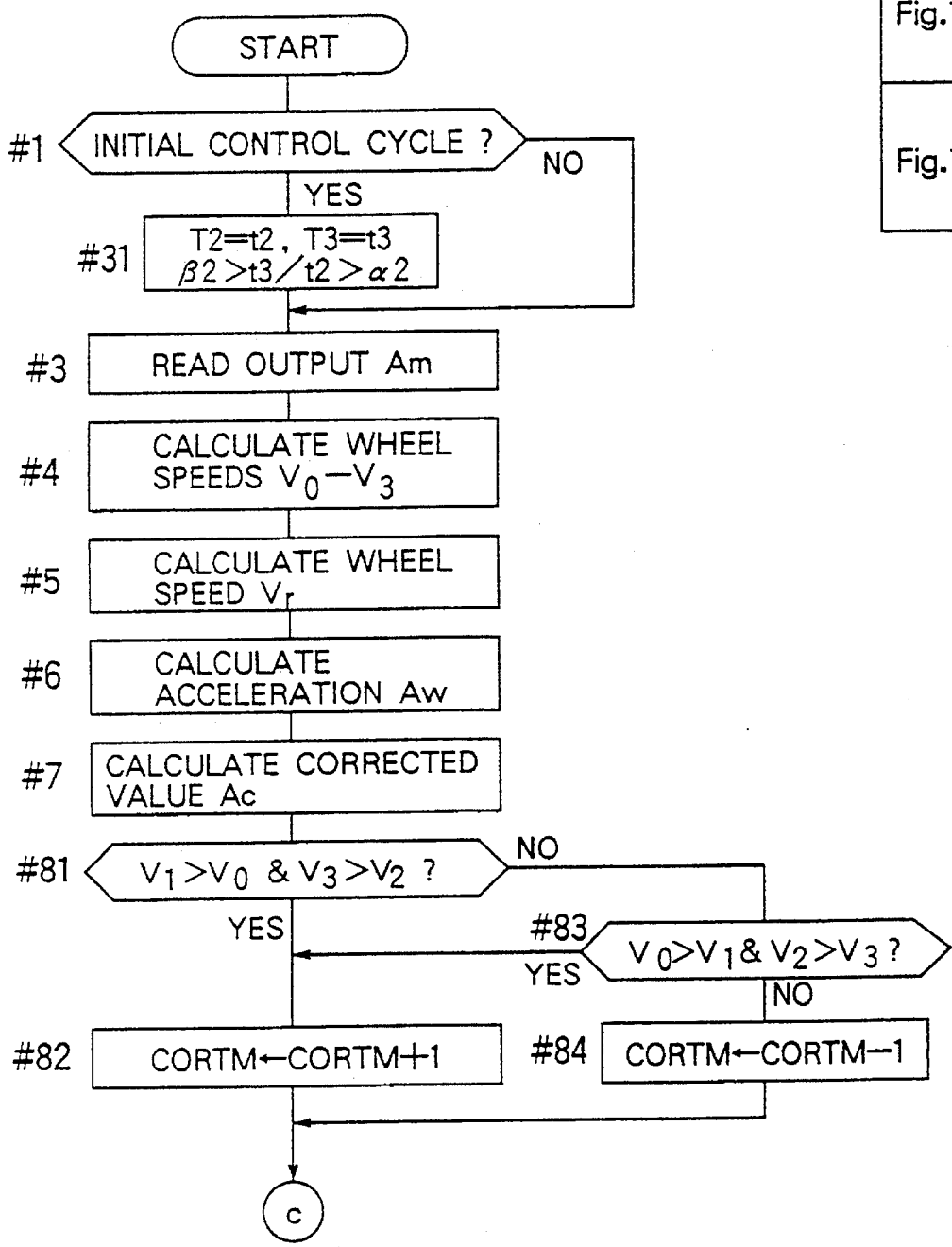
Figure 17B:
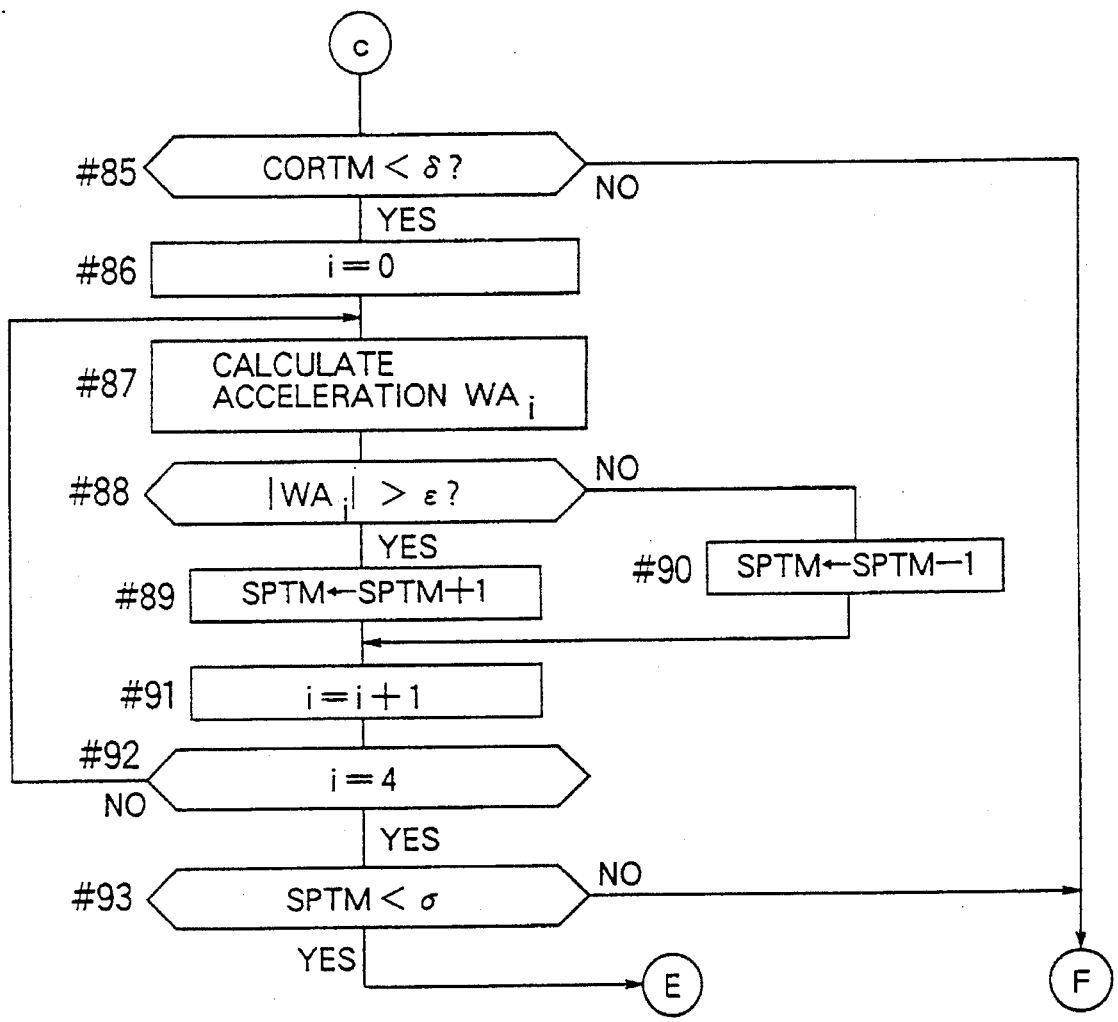

Then, operation of the apparatus K4 is described with reference to flow charts of FIGS. 17A and 17B and 18A and 18B. Processings from step #1 to step #7 of FIG. 17A are identical with those of FIG. 8. At step #81, it is judged if not only the wheel speed $V_1$ of the front right wheel FR is larger than the wheel speed $V_0$ of the front left wheel FL but the wheel speed $V_3$ of the rear right wheel RR is larger than the wheel speed $V_2$ of the rear left wheel RL. In the case of "YES" at step #81, namely, when both of the equations (3) and (4) referred to earlier are satisfied, the program flow proceeds to step #82. On the other hand, in the case of "NO"

at step #81, namely, when at least one of the equations (3) and (4) is not satisfied, the program flow proceeds to step #83.

At step #83, it is judged if not only the wheel speed $V_0$ of the front left wheel FL is larger than the wheel speed $V_1$ of the front right wheel FR but the wheel speed $V_2$ of the rear left wheel RL is larger than the wheel speed $V_3$ of the rear right wheel RR. In the case of "YES" at step #83, namely, when both of the earlier mentioned equations (5) and (6) are satisfied, the program flow proceeds to step #82. On the contrary, in the case of "NO" at step #83, namely, when at least one of the equations (5) and (6) is not satisfied, the program flow proceeds to step #84. At step #82, "1" is added to count of the turning timer CORTM for measuring duration of turning of the motor vehicle. On the other hand, at step #84, "1" is subtracted from count of the turning timer CORTM.

Subsequently, at step #85, it is judged whether or not count of the turning timer CORTM is smaller than the predetermined value δ. In the case of "YES" at step #85, it is judged that the motor vehicle is not turning, namely, the motor vehicle is running straightforwardly, so that the program flow proceeds to step #86. On the contrary, in the case of "NO" at step #85, it is judged that the motor vehicle is turning, so that the program flow proceeds to step #37 without performing addition for the second and third integrating values T2 and T3.

Processings from step #86 to step #92 are repeated for each of the wheels FL, FR, RL and RR. Initially, at step #87, the wheel acceleration $WA_i$ is calculated through linear differential of the wheel speeds $V_0$ to $V_3$. Then, at step 88, it is judged whether or not absolute value of the wheel acceleration $WA_i$ is larger than the predetermined value ε. In the case of "YES" at step #88, the program flow proceeds to step #89. On the other hand, in the case of "NO" at step #88, the program flow proceeds to step #90. At step #89, "1" is added to count of the spin timer SPTM. Meanwhile, at step #90, "1" is subtracted from count of the spin timer SPTM.

Figure 18B:
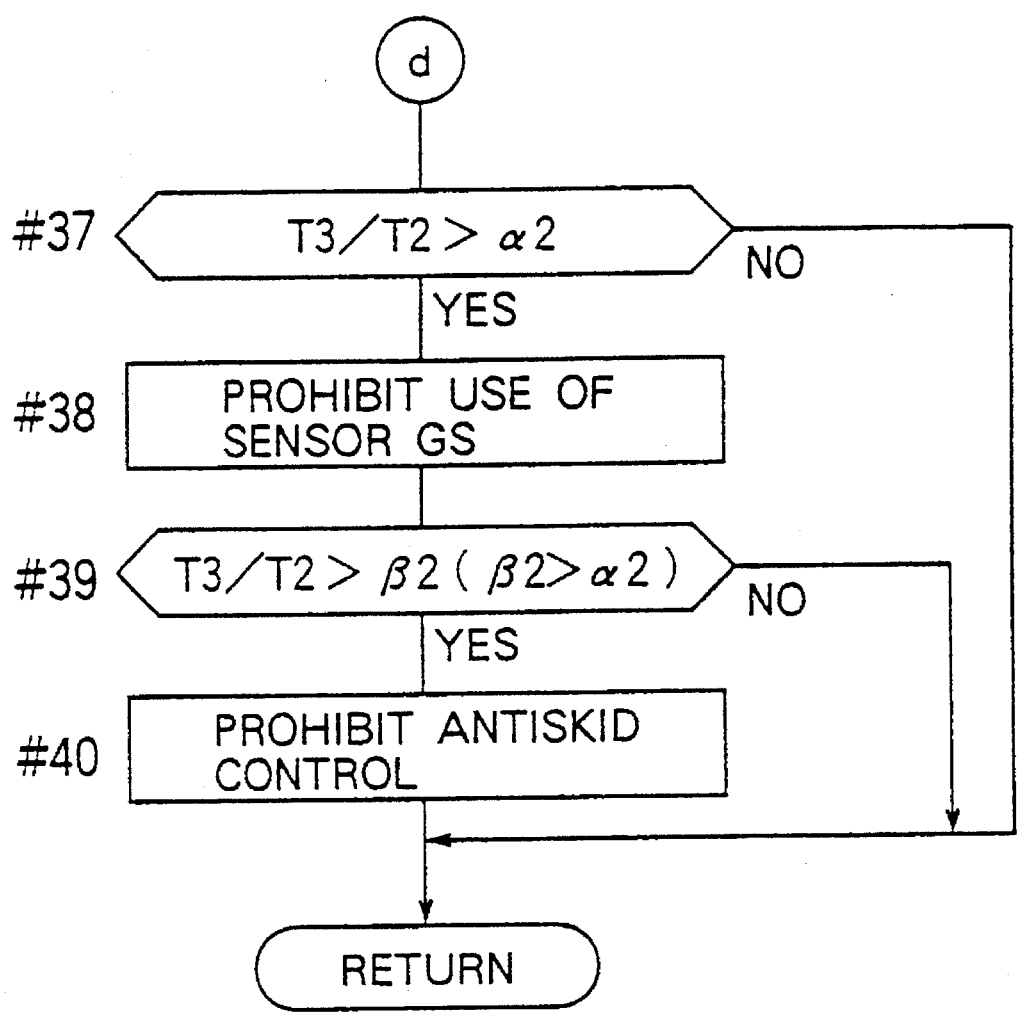

Then, at step #93, it is judged whether or not count of the spin timer SPTM is smaller than the predetermined value σ. In the case of "YES" at step #93, it is judged that the wheels FL, FR, RL and RR are not spinning, so that the program flow proceeds to step #8. On the other hand, in the case of "NO" at step #93, it is judged that the wheels FL, FR, RL and RR are spinning, so that the program flow proceeds to step #37 without performing addition for the second and third integrating values T2 and T3. Processings from step #8 to step #40 of FIGS. 18A and 18B are identical with those of the second embodiment.

As described above, in the fourth embodiment, failures of the longitudinal acceleration sensor GS are detected and are not detected when the motor vehicle is not turning and is turning, respectively in the same manner as the third embodiment. Therefore, such adverse influence that accuracy of outputs of the longitudinal acceleration sensor GS and the estimated vehicle body acceleration Aw drops at the time of turning of the motor vehicle is eliminated and thus, it is possible to detect failures of the longitudinal acceleration sensor GS more accurately.

Meanwhile, in the fourth embodiment, failures of the longitudinal acceleration sensor GS are detected and are not detected when the wheels FL, FR, RL and RR are not spinning and are spinning, respectively in the same manner as the third embodiment. Therefore, such adverse influence that the estimated vehicle body acceleration Aw becomes inaccurate at the time of spinning of the wheels FL, FR, RL and RR is obviated and thus, it is possible to detect failures of the longitudinal acceleration sensor GS more accurately.

Figure 19:
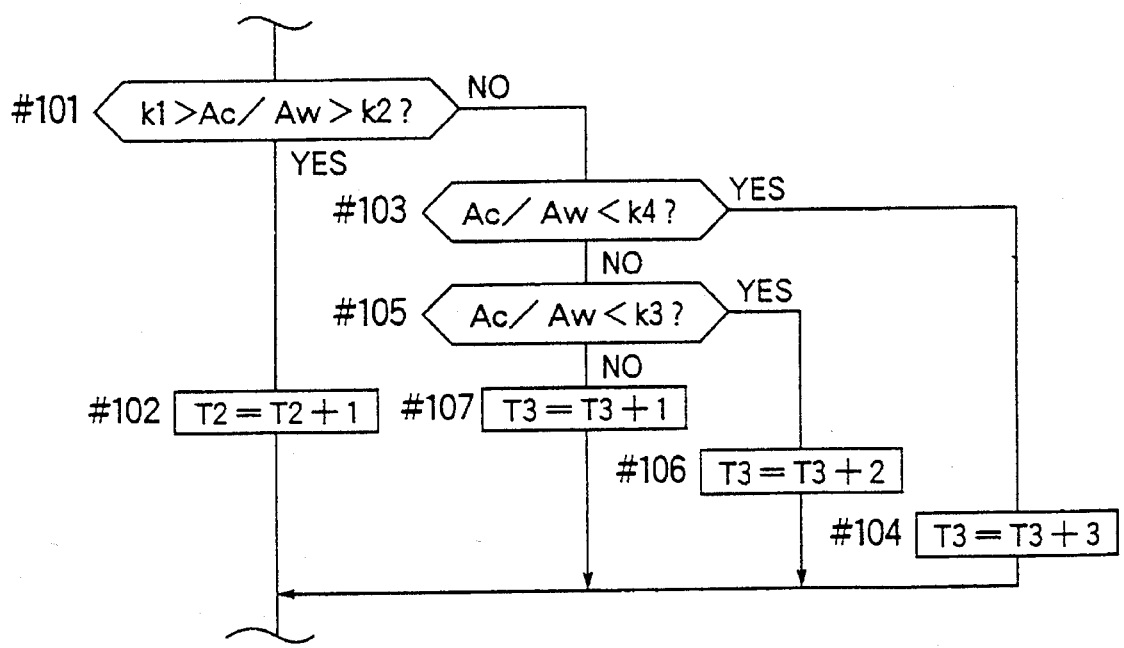
FIG. 19 is a flow chart showing a modification of the second and fourth embodiments of the present invention.

Steps #34 to #36 of the second and fourth embodiments may be replaced by steps #101 to #107 shown in FIG. 19. At step #34, the ratio (Ac/Aw) is calculated and it is judged whether or not the ratio (Ac/Aw) is smaller than the first predetermined value k1 but larger than the second predetermined value k2. In the case of "YES" at step #34, "1" is added to the second integrating value T2 at step #35. Meanwhile, in the case of "NO" at step #34, "1" is added to the third integrating value T3 at step #36. However, at steps #101 to #107, if the ratio (Ac/Aw) is not more than the second predetermined value k2, a value selected from a plurality of addends in accordance with value of the ratio (Ac/Aw) is added to the third integrating value T3. Initially, at step #101, it is judged whether or not the ratio (Ac/Aw) is smaller than the first predetermined value k1 but larger than the second predetermined value k2. In the case of "YES" at step #101, "1" is added to the second integrating value T2 at step #102. On the other hand, in the case of "NO" at step #101, it is judged at step #103 whether or not the ratio (Ac/Aw) is smaller than the fourth predetermined value k4. In the case of "YES" at step #103, the program flow proceeds to step #104. Meanwhile, in the case of "NO" at step #103, the program flow proceeds to step #105.

At step #104, "3" is added to the third integrating value T3. Meanwhile, at step #105, it is judged whether or not the ratio (Ac/Aw) is smaller than the third predetermined value k3. In the case of "YES" at step #105, the program flow proceeds to step #106. On the other hand, in the case of "NO" at step #105, the program flow proceeds to step #107. At step #106, "2" is added to the third integrating value T3. Meanwhile, at step #107, "1" is added to the third integrating value T3. As described earlier with reference to FIG. 15, the second, third and fourth predetermined values k2, k3 and k4 are set so as to satisfy relation of (k4 <k3 <k2).

As described above, in case the ratio (Ac/Aw) is not more than the second predetermined value k2, a larger value selected from a plurality of the addends is added to the third integrating value T3 as the ratio (Ac/Aw) becomes smaller. Therefore, if the corrected value Ac of detected vehicle body acceleration is far smaller than the estimated vehicle body acceleration Aw, addition for the third integrating value T3 is performed promptly and thus, a decision on prohibition of use of the longitudinal acceleration sensor GS and a decision on prohibition of antiskid control can be made early. Accordingly, when processings from step #101 to step #107 are performed, it is possible to detect failures of the longitudinal acceleration sensor GS earlier when degree of small-gain failure of the longitudinal acceleration sensor GS, which adversely affects the system seriously, especially, increase of stopping distance is high.

Meanwhile, the present invention is not restricted to the above described embodiments but may be modified variously. For example, the first to third comparative arithmetic means $COMP_1$ to $COMP_3$ are arranged to measure period from start of braking in response to signals inputted from the brake switch BS but may be adapted to judge that braking starts at the time when the estimated vehicle body acceleration Aw has reached a predetermined value.

Furthermore, the zero point correcting means COFF may be arranged to correct zero point of the sensor output Am of the longitudinal acceleration sensor GS by setting to zero point the sensor output Am obtained at the time when the motor vehicle is running at a constant speed. In this case, since small-gain failure and large-gain failure of the longitudinal acceleration sensor GS are not corrected by correction of zero point of the sensor output Am of the longitudinal acceleration sensor GS in contrast with zero point correction of the first to fourth embodiments, comparative arithmetic operation is not required to be restricted to the predetermined period from start of braking.

Moreover, the corrected value Ac of detected vehicle body acceleration, which is obtained from the longitudinal acceleration sensor GS, is used for antiskid control in the foregoing embodiments but may also be used for other control purposes, for example, control of distribution of driving force to the front and rear wheels, active suspension control, etc.

In addition, it may also be so arranged that as the ratio (Ac/Aw) becomes larger, the first and third comparative arithmetic means $COMP_1$ and $COMP_3$ select a larger value from a plurality of addends and add the larger value to the first and third integrating values T1 and T3, respectively. In this case, large-gain failure of the longitudinal acceleration sensor can be detected earlier.

As is clear from the foregoing description of the apparatuses K1 to K4 for detecting failures of the longitudinal acceleration sensor, the following effects can be achieved.

In the apparatus K1 of claim 1, the ratio of the vehicle body acceleration calculated from the output of the longitudinal acceleration sensor to the estimated vehicle body acceleration is calculated and the first integrating value is calculated by performing the subtraction and the addition for the first integrating value when the ratio falls within and out of the predetermined range, respectively. If the first integrating value is larger than the predetermined value, the predetermined fail-safe processing is performed. Therefore, also in the case of small-gain failure and large-gain failure of the longitudinal acceleration sensor, it is possible to detect failures of the longitudinal acceleration sensor positively.

In the apparatus K3 of claim 2, in case not only the motor vehicle is not turning but the wheels are not spinning, the first integrating value is calculated by performing the subtraction and the addition for the first integrating value in accordance with the ratio of the vehicle body acceleration calculated from the output of the longitudinal acceleration sensor to the estimated vehicle body acceleration. If the first integrating value is larger than the predetermined value, the predetermined fail-safe processing is performed. Therefore, since such adverse influence brought about by turning of the motor vehicle and spin of the wheels as drop of accuracy of outputs of the longitudinal acceleration sensor and the wheel speed sensors is eliminated, it is possible to detect failures of the longitudinal acceleration sensor more accurately.

In the apparatuses K1 and K3 of claims 3 and 4, only when the motor vehicle is not subjected to antiskid control, the subtraction and the addition for the first integrating value are performed. Therefore, since such adverse influence brought about during antiskid control as unstable behaviors of the wheels is obviated, it is possible to detect failures of the longitudinal acceleration sensor more accurately.

In the apparatuses K1 and K3 of claims 5 and 6, only during the predetermined period after start of braking, the subtraction and the addition for the first integrating value are performed. Therefore, also in case zero point of the output of the longitudinal acceleration sensor is corrected, failures of the longitudinal acceleration sensor can be detected positively.

In the apparatuses K1 and K3 of claims 7 and 8, when the first integrating value is larger than the first predetermined value, use of the longitudinal acceleration sensor is prohibited. Meanwhile, when the first integrating value is larger than the second predetermined value greater than the first predetermined value, system control is prohibited. Therefore, since use of the longitudinal acceleration sensor can be prohibited from a time point of appearance of symptom of failures of the longitudinal acceleration sensor, reliability and safety of the system utilizing signals from the longitudinal acceleration sensor can be enhanced further.

In the apparatuses K1 and K3 of claims 9 and 10, when the ratio of the vehicle body acceleration calculated from the output of the longitudinal acceleration sensor to the estimated vehicle body acceleration falls out of the predetermined range, the value selected from a plurality of the addends in accordance with the ratio is added to the first integrating value. Thus, it is possible to detect large-gain failure of the longitudinal acceleration sensor early. Especially, in the apparatuses K1 and K3 of claims 11 and 12, as the ratio becomes smaller, the larger value is selected from the addends and is added to the first integrating value. In this case, it becomes possible to detect small-gain failure of the longitudinal acceleration sensor earlier.

In the apparatus K2 of claim 13, the addition for the second integrating value is performed when the first ratio of the vehicle body acceleration calculated from the output of the longitudinal acceleration sensor to the estimated vehicle body acceleration falls within the predetermined range, while the addition for the third integrating value is performed when the first ratio falls out of the predetermined range. Furthermore, if the second ratio of the third integrating value to the second integrating value is larger than the predetermined value, the predetermined fail-safe processing is performed. Therefore, also in the case of small-gain failure and large-gain failure of the longitudinal acceleration sensor, it is possible to detect failures of the longitudinal acceleration sensor positively.

In the apparatus K4 of claim 14, in case not only the motor vehicle is not turning but the wheels are not spinning, the addition for the second and third integrating values is performed in accordance with the first ratio. Furthermore, if the second ratio is larger than the predetermined value, the predetermined fail-safe processing is performed. Therefore, such adverse influence brought about by turning of the motor vehicle and spin of the wheels as drop of accuracy of outputs of the longitudinal acceleration sensor and the wheel speed sensors is eliminated and thus, it is possible to detect failures of the longitudinal acceleration sensor more accurately.

In the apparatuses K2 and K4 of claims 15 and 16, only when the motor vehicle is not subjected to antiskid control, the addition for the second and third integrating values is performed. Therefore, such adverse influence brought about during antiskid control as unstable behaviors of the wheels is obviated and thus, failures of the longitudinal acceleration sensor can be detected more accurately.

In the apparatuses K2 and K4 of claims 17 and 18, only during the predetermined period after start of braking, the addition for the second and third integrating values is performed. Hence, also in case zero point of the output of the longitudinal acceleration sensor is corrected, failures of the longitudinal acceleration sensor can be detected positively.

Meanwhile, in the apparatuses K2 and K4 of claims 19 and 20, use of the longitudinal acceleration sensor is prohibited when the second ratio is larger than the third predetermined value, while system control is prohibited when the second ratio is larger than the fourth predetermined value greater than the third predetermined value. Therefore, since use of the longitudinal acceleration sensor can be prohibited from a time point of appearance of symptom of failures of the longitudinal acceleration sensor, reliability and safety of the system utilizing the signals from the longitudinal acceleration sensor can be improved further.

Furthermore, in the apparatuses K2 and K4 of claims 21 and 22, when the first ratio falls out of the predetermined range, the value selected from a plurality of the addends in accordance with the first ratio is added to the third integrating value. Therefore, it is possible to detect large-gain failure of the longitudinal acceleration sensor early. Especially, in the apparatuses K2 and K4 of claims 23 and 24, as the first ratio becomes smaller, the larger value is selected from the addends and is added to the third integrating value. Thus, in this case, small-gain failure of the longitudinal acceleration sensor can be detected earlier.

What is claimed is:

1. An apparatus for detecting failures of a longitudinal acceleration sensor for detecting a longitudinal acceleration of a motor vehicle, comprising:

wheel speed calculating means for calculating wheel speeds on the basis of outputs of wheel speed sensors;

estimated vehicle body acceleration calculating means for calculating an estimated vehicle body acceleration on the basis of the wheel speeds;

comparative arithmetic means which calculates a ratio of a vehicle body acceleration calculated from an output of a longitudinal acceleration sensor to the estimated vehicle body acceleration and calculates a first integrating value by performing a subtraction and an addition for the first integrating value when the ratio falls within and out of a predetermined range, respectively; and fail-safe means for performing a predetermined fail-safe processing if the first integrating value is larger than a predetermined value.

2. An apparatus as claimed in claim 1, said motor vehicle comprising an antiskid control, wherein only when the motor vehicle is not subjected to antiskid control, the comparative arithmetic means performs the subtraction and the addition for the first integrating value.

3. An apparatus as claimed in claim 1, said motor vehicle comprising a braking system wherein only during a predetermined period after start of braking, the comparative arithmetic means performs the subtraction and the addition for the 4. An apparatus as claimed in claim 1, said motor vehicle comprising an antiskid control, wherein when the first integrating value is larger than a first predetermined value, the fail-safe means prohibits the use of the longitudinal acceleration sensor, wherein when the first integrating value is larger than a second predetermined value, which is greater than the first predetermined value, the fail-safe means prohibits antiskid control.

5. An apparatus as claimed in claim 1, wherein when the ratio falls out of the predetermined range, the comparative arithmetic means selects a value from a plurality of addends in accordance with the ratio and adds the value to the first integrating value.

6. An apparatus as claimed in claim 5, wherein as the ratio becomes smaller, the comparative arithmetic means selects a larger value from the addends and adds the larger value to the first integrating value.

7. An apparatus for detecting failures of a longitudinal acceleration sensor for detecting a longitudinal acceleration of a motor vehicle, comprising:

wheel speed calculating means for calculating wheel speeds on the basis of outputs of wheel speed sensors;

estimated vehicle body acceleration calculating means for calculating an estimated vehicle body acceleration on the basis of the wheel speeds;

comparative arithmetic means which includes a first means for detecting that the motor vehicle is turning and a second means for detecting that wheels are spinning;

wherein when the motor vehicle is not turning and the wheel are not spinning, the comparative arithmetic means calculates a ratio of a vehicle body acceleration calculated from an output of a longitudinal acceleration sensor to the estimated vehicle body acceleration and calculates a first integrating value by performing a subtraction and an addition for the first integrating value when the ratio falls within and out of a predetermined range, respectively; and fail-safe means for performing a predetermined fail-safe processing if the first integrating value is larger than a predetermined value.

8. An apparatus as claimed in claim 7, said motor vehicle comprising an antiskid control, wherein only when the motor vehicle is not subjected to antiskid control, the comparative arithmetic means performs the subtraction and the addition for the first integrating value.

9. An apparatus as claimed in claim 7, said motor vehicle comprising a braking system, wherein only during a predetermined period after start of braking, the comparative arithmetic means performs the subtraction and the addition for the first integrating value.

10. An apparatus as claimed in claim 7, said motor vehicle comprising an antiskid control, wherein when the first integrating value is larger than a first predetermined value, the fail-safe means prohibits the use of the longitudinal acceleration sensor, wherein when the first integrating value is larger than a second predetermined value, which is greater than the first predetermined value, the fail-safe means prohibits antiskid control.

11. An apparatus as claimed in claim 7, wherein when the ratio falls out of the predetermined range, the comparative arithmetic means selects a value from a plurality of addends in accordance with the ratio and adds the value to the first integrating value.

12. An apparatus as claimed in claim 11, wherein as the ratio becomes smaller, the comparative arithmetic means selects a larger value from the addends and adds the larger value to the first integrating value.

13. An apparatus for detecting failures of a longitudinal acceleration sensor for detecting longitudinal acceleration of a motor vehicle, comprising:

wheel speed calculating means for calculating wheel speeds on the basis of outputs of wheel speed sensors;

estimated vehicle body acceleration calculating means for calculating an estimated vehicle body acceleration on the basis of the wheel speeds;

comparative arithmetic means which calculates a first ratio of a vehicle body acceleration calculated from an output of a longitudinal acceleration sensor to the estimated vehicle body acceleration and calculates a plurality of integrating values by performing an addition for said plurality of integrating values when the first ratio falls within and out of a predetermined range, respectively, said plurality of integrating values comprising first and second determined integrating values; and fail-safe means for performing a predetermined fail-safe processing if a second ratio of the second determined integrating value to the first determined integrating value is larger than a predetermined value.

14. An apparatus as claimed in claim 13, said motor vehicle comprising an antiskid control wherein only when the motor vehicle is not subjected to antiskid control, the comparative arithmetic means performs the addition for the first and second determined integrating values.

15. An apparatus as claimed in claim 13, said motor vehicle comprising a braking system, wherein only during a predetermined period after start of braking, the comparative arithmetic means performs the addition for the first and second determined integrating values.

16. An apparatus as claimed in claim 13, said motor vehicle comprising an antiskid control, wherein when the second ratio is larger than a third predetermined value, the fail-safe means prohibits use of the longitudinal acceleration sensor, wherein when the second ratio is larger than a fourth predetermined value, which is greater than the third predetermined value, the fail-safe means prohibits antiskid control.

17. An apparatus as claimed in claim 13, wherein when the first ratio falls out of the predetermined range, the comparative arithmetic means selects a value from a plurality of addends in accordance with the first ratio and adds the value to the second determined integrating value.

18. An apparatus as claimed in claim 17, wherein as the first ratio becomes smaller, the comparative arithmetic means selects a larger value from the addends and adds the larger value to the second determined integrating value.

19. An apparatus for detecting failures of a longitudinal acceleration sensor for detecting a longitudinal acceleration of a motor vehicle, comprising:

wheel speed calculating means for calculating wheel speeds on the basis of outputs of wheel speed sensors;

estimated vehicle body acceleration calculating means for calculating an estimated vehicle body acceleration on the basis of wheel speeds;

comparative arithmetic means which includes a first means for detecting that the motor vehicle is turning and a second means for detecting that the wheels are spinning;

wherein when the motor vehicle is not turning and the wheels are not spinning, the comparative arithmetic means calculates a first ratio of a vehicle body acceleration, and calculates a plurality of integrating values by performing an addition for the plurality of integrating values when the first ratio falls within and out of a predetermined range respectively, said plurality of integrating values comprising first and second determined integrating values; and fail-safe means for performing a predetermined fail-safe processing if a second ratio of the second determined integrating value to the first determined integrating value is larger than a predetermined value.

20. An apparatus as claimed in claim 19, said motor vehicle comprising an antiskid control, wherein only when the motor vehicle is not subjected to antiskid control, the comparative arithmetic means performs the addition for the first and second determined integrating values.

21. An apparatus as claimed in claim 19, said motor vehicle comprising a braking system, wherein only during a predetermined period after start of braking, the comparative arithmetic means performs the addition for the first and second determined integrating values.

22. An apparatus as claimed in claim 19, said motor vehicle comprising an antiskid control, wherein when the second ratio is larger than a third predetermined value, the fail-safe means prohibits use of the longitudinal acceleration sensor, wherein when the second ratio is larger than a fourth predetermined value, which is greater than the third predetermined value, the fail-safe means prohibits antiskid control.

23. An apparatus as claimed in claim 19, wherein when the first ratio falls out of the predetermined range, the comparative arithmetic means selects a value from a plurality of addends in accordance with the first ratio and adds the value to the second determined integrating value.

24. An apparatus as claimed in claim 23, wherein as the first ratio becomes smaller, the comparative arithmetic means selects a larger value from the addends and adds the larger value to the second determined integrating value.

25. An apparatus for detecting failures of a longitudinal acceleration sensor for detecting a longitudinal acceleration of a motor vehicle, comprising;

estimated vehicle body acceleration calculating means for calculating an estimated vehicle body acceleration;

calculation means which calculates a ratio of a vehicle body acceleration calculated from an output of a longitudinal acceleration sensor to the estimated vehicle body acceleration and calculates a first integrating value by performing a subtraction for the first integrating value when the ratio falls within and performing an addition for the first integrating value when the ratio falls out of a predetermined range; and fail-safe means for performing a predetermined fail-safe processing if the first integrating value is larger than a predetermined value.

* * * * *

UNITED STATES PATENT AND TRADEMARK OFFICE
CERTIFICATE OF CORRECTION

PATENT NO. : 5,483,452
DATED : January 9, 1996
INVENTOR(S) : H. TANAKA

It is certified that error appears in the above-indentified patent and that said Letters Patent is hereby corrected as shown below:

At column 21, line 40 (claim 3, line 5), after "the", insert ---first integrating value.---.

At column 23, lines 44-45 (claim 19, lines 15-16), after "acceleration", insert ---calculated from an output of a longitudinal acceleration sensor to the estimated vehicle body acceleration---.

Signed and Sealed this

Seventeenth Day of December, 1996

Attest:

BRUCE LEHMAN

*Attesting Officer*  *Commissioner of Patents and Trademarks*